(12) United States Patent
Ishii et al.

(10) Patent No.: US 11,718,256 B2
(45) Date of Patent: Aug. 8, 2023

(54) AIRBAG DEVICE

(71) Applicant: TOYODA GOSEI CO., LTD., Kiyosu (JP)

(72) Inventors: Tsutomu Ishii, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/705,492

(22) Filed: Mar. 28, 2022

(65) Prior Publication Data

US 2022/0306034 A1 Sep. 29, 2022

(30) Foreign Application Priority Data

Mar. 29, 2021 (JP) .................................. 2021-056096

(51) Int. Cl.
*B60R 21/203* (2006.01)
*B60R 21/233* (2006.01)
*B60R 21/2338* (2011.01)

(52) U.S. Cl.
CPC .......... *B60R 21/203* (2013.01); *B60R 21/233* (2013.01); *B60R 21/2338* (2013.01); *B60R 2021/23332* (2013.01); *B60R 2021/23382* (2013.01)

(58) Field of Classification Search
CPC . B60R 21/203; B60R 21/233; B60R 21/2338; B60R 21/2346; B60R 2021/23332; B60R 2021/23382
See application file for complete search history.

(56) References Cited

U.S. PATENT DOCUMENTS

| | | | | |
|---|---|---|---|---|
| 5,848,805 A | * | 12/1998 | Sogi | B60R 21/2346 280/743.2 |
| 5,913,535 A | * | 6/1999 | Taguchi | B60R 21/2346 280/743.1 |
| 6,086,092 A | * | 7/2000 | Hill | B60R 21/233 280/743.2 |
| 6,247,727 B1 | * | 6/2001 | Hamada | B60R 21/2338 280/743.1 |
| 6,382,662 B1 | | 5/2002 | Igawa | |

(Continued)

FOREIGN PATENT DOCUMENTS

| | | | |
|---|---|---|---|
| JP | 11321506 A | * | 11/1999 |
| JP | 2001-080440 A | | 3/2001 |

(Continued)

*Primary Examiner* — Laura Freedman

(74) *Attorney, Agent, or Firm* — Posz Law Group, PLC

(57) ABSTRACT

An airbag device includes an airbag including: an outer bag; and an inner bag disposed so as to inflate inside the outer bag and having supply ports through which the inflation gas is supplied to the outer bag, the outer bag and the inner bag sharing the inflow opening and the attachment portion. At least one of the supply ports is provided as a lower side supply port disposed in the lower side wall portion, and a gas guide tether that connects a vicinity of an outer edge side of the lower side supply port and the vehicle body side wall portion so as to be able to guide the inflation gas supplied from the lower side supply port to the vehicle body side wall portion side in an inner peripheral surface of the outer bag along a radial direction centered on the inflow opening is provided.

5 Claims, 14 Drawing Sheets

(56) References Cited

U.S. PATENT DOCUMENTS

| | | | | |
|---|---|---|---|---|
| 6,648,366 | B2* | 11/2003 | Dillon | B60R 21/2346 280/740 |
| 7,040,655 | B2* | 5/2006 | Igawa | B60R 21/2346 280/739 |
| 7,360,791 | B2* | 4/2008 | Yamada | B60R 21/2338 280/743.2 |
| 7,857,347 | B2* | 12/2010 | Abe | B60R 21/239 280/739 |
| 8,215,665 | B2* | 7/2012 | Ohara | B60R 21/2346 280/740 |
| 8,308,191 | B2* | 11/2012 | Hiruta | B60R 21/239 280/736 |
| 8,465,049 | B2* | 6/2013 | Tsujimoto | B60R 21/2346 280/732 |
| 8,851,513 | B2* | 10/2014 | Tsujimoto | B60R 21/231 280/732 |
| 8,899,618 | B2* | 12/2014 | Eckert | B60R 21/2338 280/743.2 |
| 9,283,921 | B2* | 3/2016 | Vinton | B60R 21/2346 |
| 9,902,360 | B2* | 2/2018 | Park | B60R 21/233 |
| 10,829,081 | B2* | 11/2020 | Nakajima | B60R 21/239 |
| 10,919,483 | B2* | 2/2021 | Hotta | B60R 21/216 |
| 11,358,561 | B2* | 6/2022 | Ishii | B60R 21/217 |
| 11,370,378 | B2* | 6/2022 | Hotta | B60R 21/2338 |
| 11,383,664 | B2* | 7/2022 | Yamamoto | B60R 21/2338 |
| 2007/0278774 | A1 | 12/2007 | Ishiguro et al. | |
| 2018/0215339 | A1 | 8/2018 | Nakanishi et al. | |
| 2018/0281731 | A1* | 10/2018 | Hotta | B60R 21/2338 |

FOREIGN PATENT DOCUMENTS

| | | |
|---|---|---|
| JP | 2012-006598 A | 1/2012 |
| JP | 2018-122798 A | 8/2018 |

* cited by examiner

AIRBAG DEVICE

CROSS-REFERENCE TO RELATED APPLICATIONS

This application is based upon and claims the benefit of priority from prior Japanese patent application No. 2021-056096 filed on Mar. 29, 2021, the entire contents of which are incorporated herein by reference.

BACKGROUND

1. Field of the Invention

The present invention relates to an airbag device in which an airbag that inflates so as to be able to protect an occupant at a time of operation includes an outer bag constituting an outer peripheral wall at a time of inflation completion, and an inner bag that is disposed so as to inflate inside the outer bag and has supply ports through which inflation gas can be supplied to the outer bag.

2. Description of the Related Art

In the related art, in this type of airbag device, for example, a driver's seat airbag device, an airbag is folded and accommodated with a boss portion positioned in the vicinity of a center of a substantially annular ring portion (steering portion) gripped in a steering wheel at a time of steering as an accommodating portion (see, for example, JP-A-2012-6598 and JP-A-201.8-122798). An outer peripheral wall of the airbag at a time of inflation completion includes an occupant side wall portion (driver side wall portion) capable of receiving a driver as an occupant, and a vehicle body side wall portion whose outer peripheral edge is connected to an outer peripheral edge of the occupant side wall portion and that is supported by a ring surface (support surface) on an upper surface side inclined rearward and downward in the ring portion, and is provided with, in the vicinity of a center of the vehicle body side wall portion, an inflow opening that is opened to allow inflation gas to flow in and an attachment portion that is disposed on a peripheral edge of the inflow opening and is fixed to a boss portion side. The airbag includes an outer bag constituting the outer peripheral wall at the time of inflation completion, and an inner bag that is disposed so as to inflate inside the outer bag and has a supply port through which the inflation gas can be supplied to the outer bag. The outer bag and the inner bag share the inflow opening and the attachment portion. In such an airbag, in order to prevent the outer bag from floating up, the outer bag can be quickly pressed against the ring surface by the inflated inner bag (see JP-A-2012-6598), or the outer bag having a narrow area of a support portion on the ring surface can be supported by the inflated inner bag that maintains internal pressure (see JP-A-2018-122798).

However, in the airbag device of the related art, when a driver as an occupant sits close to a peripheral edge of the accommodating portion of the airbag in the steering wheel, that is, the ring portion of a peripheral edge of the boss portion, a rear end side of the outer bag is less likely to enter between the approaching driver and the ring portion of the steering wheel as a vehicle body side member, that is, between the occupant approaching to the accommodating portion and the vehicle body side member of the peripheral edge of the accommodating portion. Therefore, in the airbag device of the related art, there is room for improvement in that an intrusion amount of an end portion side of the outer bag at the time of inflation into a space between the vehicle body side member and the occupant approaching the vehicle body side member is increased to smoothly protect the approaching occupant.

SUMMARY

The present invention has been made to solve the above-described problem, and an object thereof is to provide an airbag device capable of suitably protecting an occupant by an inflated airbag even when the occupant is approaching a peripheral edge of an accommodating portion in a vehicle body side member at a time of operation.

Solution to Problem

According to an aspect of the present invention, there is provided an airbag device including: an airbag that is supported by a peripheral edge of an accommodating portion in a vehicle body side member and completes inflation so as to be able to receive an occupant by causing inflation gas to flow therein and protruding from the accommodating portion disposed in the vehicle body side member at a time of operation, where: an outer peripheral wall of the airbag at a time of inflation completion includes an occupant side wall portion capable of receiving the occupant, and a vehicle body side wall portion whose outer peripheral edge is connected to an outer peripheral edge of the occupant side wall portion and that is supported by the vehicle body side member at the peripheral edge of the accommodating portion; in the vicinity of a center of the vehicle body side wall portion, an inflow opening that is opened to allow the inflation gas to flow in, and an attachment portion that is disposed at a peripheral edge of the inflow opening and is fixed to an accommodating portion side are provided; the airbag includes an outer bag constituting the outer peripheral wall at the time of inflation completion, and an inner bag disposed so as to inflate inside the outer bag and having a plurality of supply ports through which the inflation gas is supplied to the outer bag, the outer bag and the inner bag sharing the inflow opening and the attachment portion; the inner bag completes the inflation prior to the outer bag, and the outer bag is inflated by the inflation gas supplied from the supply ports; an outer peripheral wall of the inner bag at the time of inflation completion includes: an upper side wall portion facing the occupant side wall portion of the outer bag; and a lower side wall portion whose outer peripheral edge is connected to an outer peripheral edge of the upper side wall portion, that faces the vehicle body side wall portion, and in which the inflow opening and the attachment portion are disposed; at least one of the plurality of supply ports is provided as a lower side supply port disposed in the lower side wall portion and a gas guide tether that connects a vicinity of an outer edge side of the lower side supply port and the vehicle body side wall portion so as to be able to guide the inflation gas supplied from the lower side supply port to the vehicle body side wall portion side in an inner peripheral surface of the outer bag along a radial direction centered on the inflow opening is provided.

In the airbag device according to the present invention, at a time of operation, the inflation gas flows into the inner bag, the inner bag is inflated, and the inflation gas is supplied from the supply port to the outer bag. At this time, in the vicinity of the lower side supply port in which the gas guide tether is disposed in the vicinity of the outer edge side, inflation gas flowing out from the lower side supply port is guided by the gas guide tether and flows toward the vehicle body side wall portion in the outer bag. That is, the gas guide tether is disposed so as to couple the vicinity of the outer edge side of the lower side supply port and the vehicle body side wall portion of the outer bag along the radial direction centered on the inflow opening of the inner bag. Therefore, even if the inflation gas flowing out from the lower side supply port tries to flow out from the lower side supply port along the radial direction connecting the arrangement position of the lower side supply port from the inflow opening, the inflation gas hits the gas guide tether whose distal end portion side is coupled to the vehicle body side wall portion from the vicinity of the outer edge side of the lower side supply port, and then flows, being guided by the gas guide tether, so as to press the end portion of the outer bag against the vehicle body side member of the peripheral edge of the accommodating portion. In other words, when a portion of the outer peripheral edge of the vehicle body side wall portion in the direction toward the radial direction from the inflow opening in which the lower side supply port of the inner bag in the outer bag and the gas guide tether are disposed is quickly set as the portion to be inserted between the occupant and the vehicle body side member, and the airbag device is disposed, the outer bag is inflated in a state in which the portion of the outer peripheral edge of the vehicle body side wall portion is pressed against the vehicle body side member by the inflation gas at an initial stage of the inflation of the airbag. Therefore, when the lower side supply port of the inner bag and the gas guide tether are disposed on an area side where the outer bag is likely to approach the occupant during the operation, the end portion of the outer bag can smoothly enter and inflate between the approaching occupant and the vehicle body side member, whereby the occupant can be protected. The inflation gas flowing out of the lower side supply port of the inner bag may directly hit the vehicle body side wall portion without hitting the gas guide tether, and may flow so as to press the end portion of the outer bag against the vehicle body side member of the peripheral edge of the accommodating portion, and a flow of the inflation gas also can cause the end portion of the outer bag to smoothly enter and inflate between the approaching occupant and the vehicle body side member. However, with the gas guide tether, it is possible to more effectively promote an action of pressing the end portion of the outer bag against the vehicle body side member of the peripheral edge of the accommodating portion.

Therefore, in the airbag device according to the present invention, even when the occupant is approaching the peripheral edge of the accommodating portion of the vehicle body side member at the time of operation, the occupant can be suitably protected by the inflated airbag.

In the aspect, a coupling portion with the vehicle body side wall portion may be connected to a connection portion between the outer peripheral edges of the vehicle body side wall portion and the occupant side wall portion to dispose the gas guide tether.

In such a configuration, the distal end portion of the gas guide tether on the outer bag side is coupled to the connection portion between the outer peripheral edge of the vehicle body side wall portion and the outer peripheral edge of the occupant side wall portion, and the inflation gas flowing out from the lower side supply port opened in the lower side wall portion of the inner bag can be accurately guided toward the vehicle body side wall portion side rather than toward the occupant side wall portion side. Further, the distal end portion of the gas guide tether on the outer bag side is coupled to the connection portion between the outer peripheral edge of the vehicle body side wall portion and the outer peripheral edge of the occupant side wall portion and is coupled by suturing, as compared to a case where the distal end portion is coupled to the single portion of the vehicle body side wall portion, gas leakage can be prevented, and the gas guide tether can be coupled to the vehicle body side wall portion side.

In the aspect, the lower side supply port may be disposed on a rear end portion side of the inner bag, the supply ports of the inner bag may include the lower side supply port and upper side supply ports disposed on both left and right sides of the upper side wall portion on a front side of the lower side supply port, and the lower side supply port may be disposed such that an opening area thereof at a time of opening is larger than a total opening area of the upper side supply ports at the time of opening.

In such a configuration, since the inflation gas is supplied to the vehicle body side wall portion side of the outer bag from the lower side supply port having a large opening area when the inner bag is inflated, the upper side wall portion of the inner bag, particularly the rear portion side moves upward due to the reaction force for discharging the inflation gas. This behavior causes the occupant moving forward so as to approach the rear side peripheral edge of the accommodating portion to be pressed rearward at the time of operation, and thus the occupant can be appropriately pushed rearward so as to be separated from the vehicle body side member. Further, the opening area of the lower side supply port is set to be larger than the total opening area of the upper side supply ports on both the left and right sides, whereby the inflation gas can be made to flow quickly, the rear portion side of the inner bag can quickly push the occupant approaching the vicinity of the accommodating portion rearward so as to be separated from the vicinity of the accommodating portion, and further, inflation of a rear portion side of the outer bag can be promoted. Further, the upper side supply ports are disposed on both the left and right sides of the upper side wall portion of the inner bag positioned in front of the lower side supply port, and even when the vicinity of a jaw of the occupant is approaching the airbag on a front portion side of the outer bag, the front portion side of the outer bag branches to both the left and right sides and the inflation gas can be supplied thereto without directly applying the inflation gas to the vicinity of the jaw of the occupant, the vicinity of the jaw of the approaching occupant can be pushed by the outer bag so as to be separated from the vicinity of the accommodating portion, and the inflated outer bag can be interposed between the vicinity of a head of the occupant and the vehicle body side member. Further, since the upper side supply ports are opened in the lower side wall portion provided with the lower side supply port and the upper side wall portion whose upper and lower sides are reversed, and a direction of the reaction force acting on the inner bag is opposite to the lower side supply port side, the inflation gas can be supplied upward to the outer bag side while maintaining a stable opening surface without deforming the upper wall portion itself so as to float upward. As a result, the entire outer bag can complete the inflation by the inflation gas supplied from the lower side supply port and the upper side supply ports of the inner bag in a well-balanced manner and receive the occupant.

In the aspect, a displacement prevention tether that extends outward from a vicinity of an outer peripheral edge of the inner bag and is coupled to the outer bag may be disposed on both left and right sides of a front portion side of the inner bag.

In such a configuration, the left and right displacement prevention tethers can prevent the left and right upper side supply ports of the inner bag from being displaced, so that the outflow direction of the inflation gas flowing out from the upper side supply ports can be stabilized. Further, in such a configuration, since the inner bag is disposed in the outer bag without being displaced by the displacement prevention tethers on both the left and right sides and the gas guide tether on the rear side, an arrangement position of the inner bag in the outer bag can be stabilized in folding or the like.

In the aspect, the airbag may be provided with a boss portion positioned in the vicinity of a center of a steering portion in a steering wheel gripped at a time of steering is disposed as the accommodating portion, the airbag may be configured to support the vehicle body side wall portion of the outer bag at the time of inflation completion with an upper surface side inclined rearward and downward in the steering portion as a support surface, and the airbag may be used for a driver's seat.

In such a configuration, even when the driver as the occupant is approaching the rear end side of the steering portion at the time of operation, the rear end portion of the outer bag can be caused to enter a narrow gap between an abdomen portion of the driver and the rear end of the steering portion to inflate, and therefore the approaching driver can be smoothly protected.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
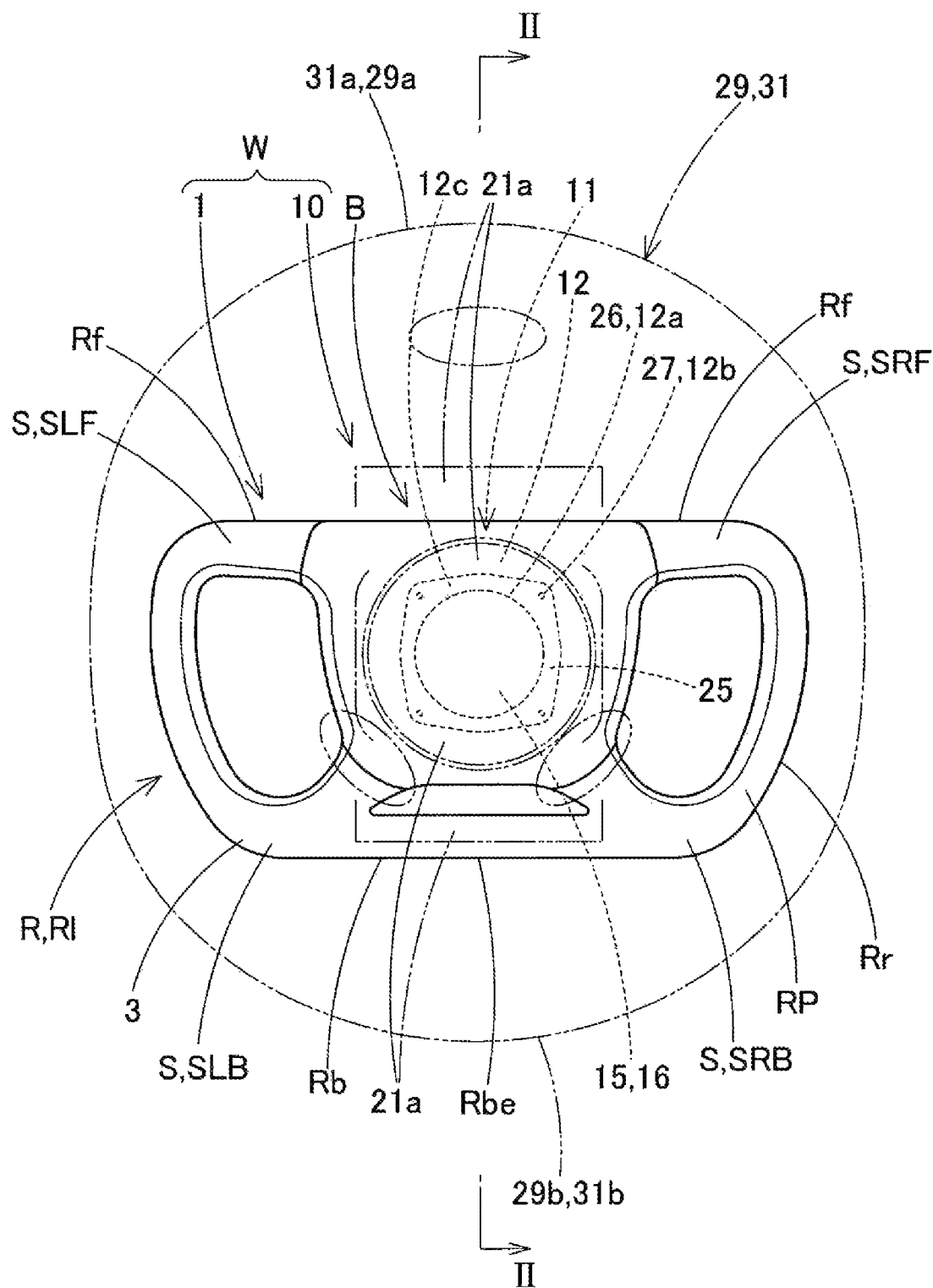
FIG. 1 is a schematic plan view of a steering wheel equipped with an airbag device for a driver's seat according to an embodiment of the present invention.
Figure 2:
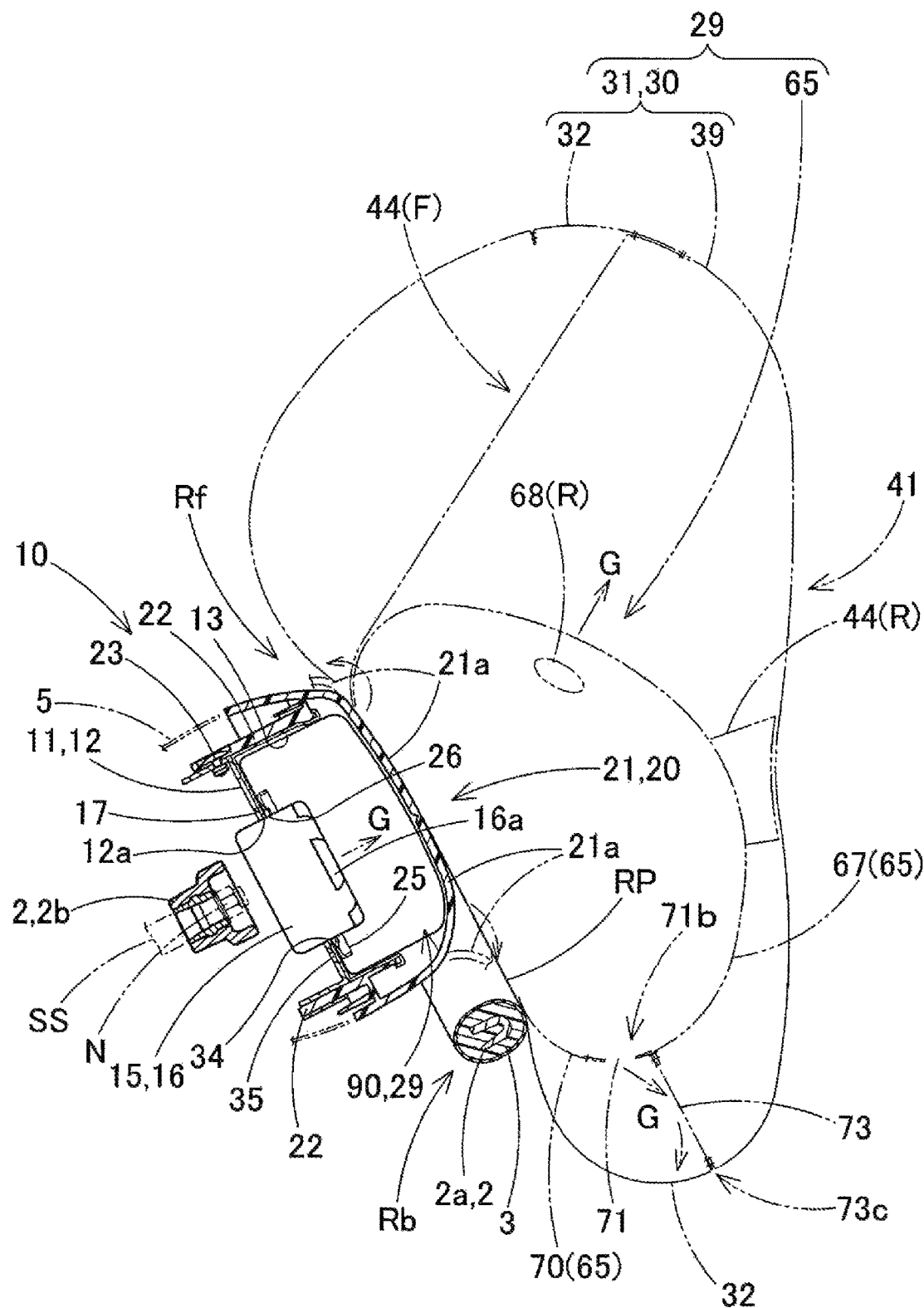
FIG. 2 is a schematic longitudinal sectional view of the steering wheel equipped with the airbag device according to the embodiment, and corresponds to a portion taken along a line II-II in FIG. 1.

Hereinafter, an embodiment of the present invention will be described with reference to the drawings, and as shown in FIGS. 1 and 2, an airbag device 10 according to the embodiment is an airbag device 10 for a drives seat that is attached and fixed to a boss portion B of a steering wheel W as a vehicle body side member. The steering wheel W includes a steering wheel main body 1 including the boss portion B disposed in a center, a ring portion R disposed on an outer peripheral edge side extending outward from the boss portion B and serving as a grip portion to be gripped at a time of steering, and a spoke portion S coupling the ring portion R and the boss portion B, and the airbag device 10 disposed above the boss portion B. The boss portion B serves as an accommodating portion of an airbag 29 to be described later of the airbag device 10.

Further, vertical, horizontal and longitudinal directions of the airbag device 10, the airbag 29, the steering wheel W and the like of the present specification are based on straight steering of a vehicle in a state of connecting the steering wheel W to a steering shaft SS of the vehicle by a nut N. The vertical direction corresponds to a vertical direction extending along an axial direction of the steering shaft SS, the horizontal direction corresponds to a horizontal direction of the vehicle in a direction orthogonal to the axis of the steering shaft SS, and the longitudinal direction substantially corresponds to a longitudinal direction of the vehicle in a direction orthogonal to the axis of the steering shaft SS.

In the steering wheel main body 1 of the steering wheel W according to the embodiment, the spoke portion S extending from the boss portion B includes four spoke portions SLF, SLB, SRF, and SRB extending frontward and rearward on both left and right sides, and the ring portion R is formed in a substantially U shape in a plan view so as to couple the spoke portions S on a rear side of the boss portion B.

The steering wheel body 1 includes a core metal 2 disposed to couple the ring portion R, the boss portion B and the spoke portion S to one another, and a coating layer 3 made of urethane or the like that covers the ring portion R and a site of the core metal 2 of the spoke portion S near the ring portion R. The core metal 2 includes a ring core metal portion 2a disposed in the ring portion R, a boss core metal portion 2b disposed in the boss portion B and connected to the steering shaft SS, and a spoke core metal portion (not shown) disposed in each of the spoke portions S and coupling the ring core metal portion 2a and the boss core metal portion 2b.

Further, the steering wheel W is configured by disposing a lower cover F on a lower surface side of the boss portion B.

The ring portion R of the steering wheel W at a time of being mounted on the vehicle is configured such that a rear portion Rb side is lower than a front portion Rf so as to facilitate the steering, and therefore, a support surface of the airbag 29 that supports a vehicle body side wall portion 32 to be described later, that is, a ring surface RP on an upper surface side of the ring portion R is disposed so as to be inclined rearward and downward and obliquely upward and rearward.

The airbag device 10 includes a substantially columnar completely folded body 90 (see FIGS. 11A and 11B) in which the airbag 29 is folded, an inflator 15 for supplying inflation gas G to the airbag 29, an airbag cover (pad) 20 made of synthetic resin disposed on the upper surface side of the boss portion B to cover the completely folded body 90, and a bag holder (case) 11 made of metal and holding the completely folded body 90 (airbag 29) in order to mount the completely folded body 90 on the boss portion B of the steering wheel W The bag holder 11 is a portion for fixedly attaching and accommodating the completely folded body 90, and is also a portion for holding the inflator 15 and the airbag cover 20.

Figure 8A:
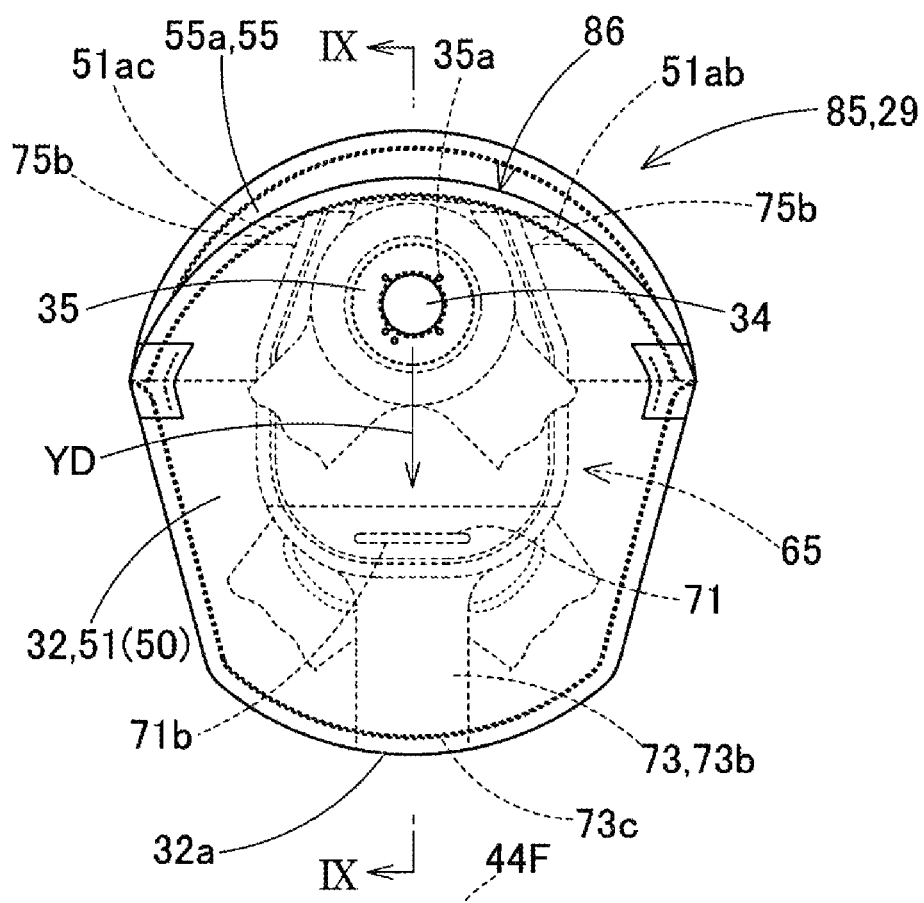
FIG. 8A and FIG. 8B are a bottom view and a plan view showing a folding preparation body of the airbag according to the embodiment.
Figure 8B:
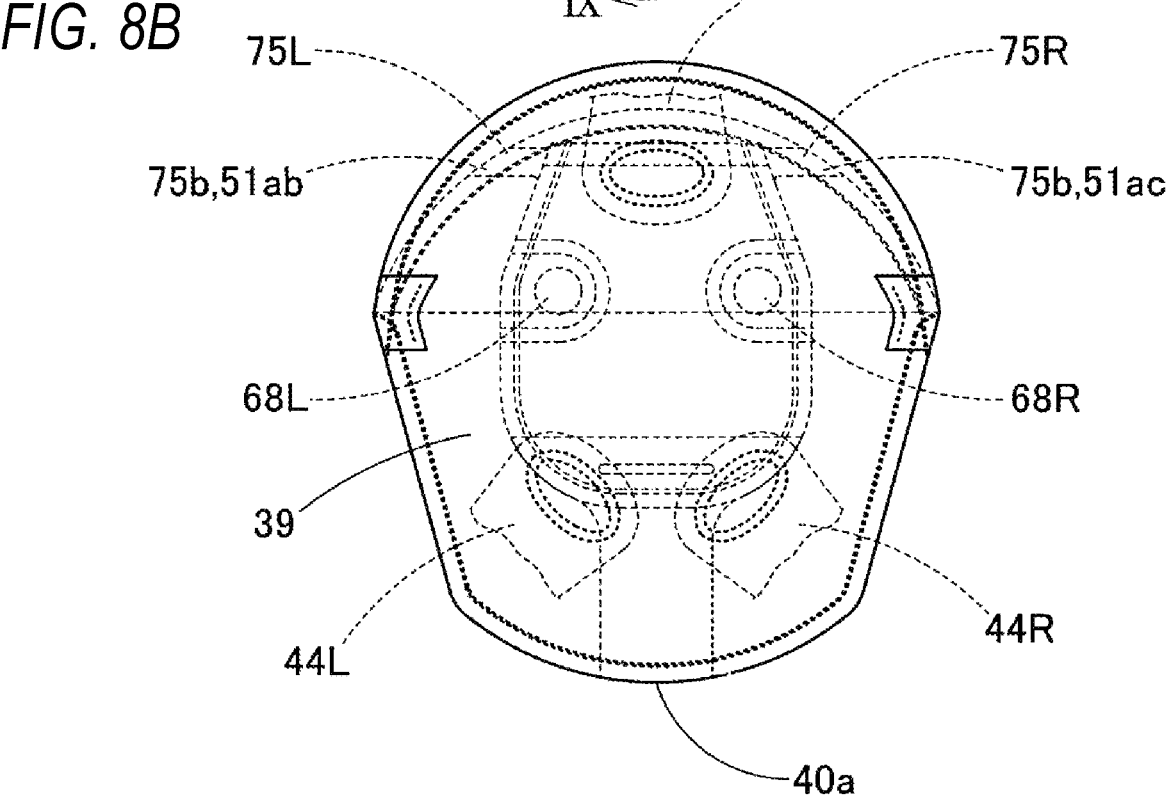

In the completely folded body 90 in which the airbag 29 is folded, a rectangular annular retainer 25 made of sheet metal for attaching and fixing the airbag 29 to the bag holder 11 is disposed inside a bottom surface side of the completely folded body 90. Then, the airbag 29 is formed to a folding preparation body 85 that is flatly deployed (see FIGS. 8A, 8B and 10) while assembling the retainer 25, and is further folded from the folding preparation body 85 to the completely folded body 90 (see FIGS. 10, 11A and 11B) to be attached and fixed to the bag holder 11. The retainer 25 has a communication opening 26 in which a main body portion 16 of the inflator 15, which will be described later, is inserted in a center of the retainer 25 as a square ring shape with bolts 27 projecting downward at four corners.

The inflator 15 includes the substantially columnar main body portion 16 and a rectangular annular flange portion 17 disposed on an outer peripheral surface side of the main body portion 16. A plurality of gas discharge ports 16a for discharging the inflation gas G are disposed in an upper portion side of the main body portion 16. Through holes (not shown) through which the bolts 27 of the retainer 25 passes are formed in the flange portion 17.

The airbag cover 20 is made of the synthetic resin such as an olefin-based thermoplastic elastomer (TPO), and is disposed on the upper surface side of the boss portion B in the vicinity of the center of the steering wheel W. The airbag cover 20 includes a ceiling wall portion 21 that covers an upper side of the completely folded body 90 folded and accommodated inside the boss portion B, and a side wall portion 22 that extends in a substantially cylindrical shape from a lower surface of the ceiling wall portion 21 and covers an outer periphery of the substantially columnar completely folded body 90.

The ceiling wall portion 21 is provided with door portions 21a that are pushed by the inflated airbag 29 to open to both front and rear sides, Each of the door portions 21a is formed by providing a thin breakable portion (not shown) at a peripheral edge thereof.

The side wall portion 22 of the airbag cover 20 is engaged with the side wall support portion 13 of the bag holder 11 or is coupled to the side wall support portion 13 by a riveted 23.

The bag holder 11 is made of sheet metal and holds the completely folded body 90, the inflator 15, and the airbag cover 20, and is further configured as a sheet metal member for attaching the airbag device 10 to the steering wheel main body 1 side by using a coupling bracket (not shown). The bag holder 11 includes a substantially annular base plate portion 12 and the side wall support portion 13 protruding from an outer peripheral edge of the base plate portion 12 to both upper and lower sides.

Corresponding to an inflow opening 34 of the airbag 29, a substantially circular insertion hole 12a into which the main body portion 16 of the inflator 15 can be inserted from below is opened at a center of the base plate portion 12, and four through holes 12b through which the respective bolts 27 of the retainer 25 pass are formed at a peripheral edge of the insertion hole 12a. Portions of the peripheral edge of the insertion hole 12a at which the through holes 12b are provided serve as an attachment seat 12c for attaching the completely folded body 90 and the inflator 15 using the retainer 25.

As described above, the side wall support portion 13 is formed with a locking portion (not shown) for coupling and holding the side wall portion 22 of the airbag cover 20 and a coupling hole (not shown) through which the rivet 23 is inserted.

Figure 3:
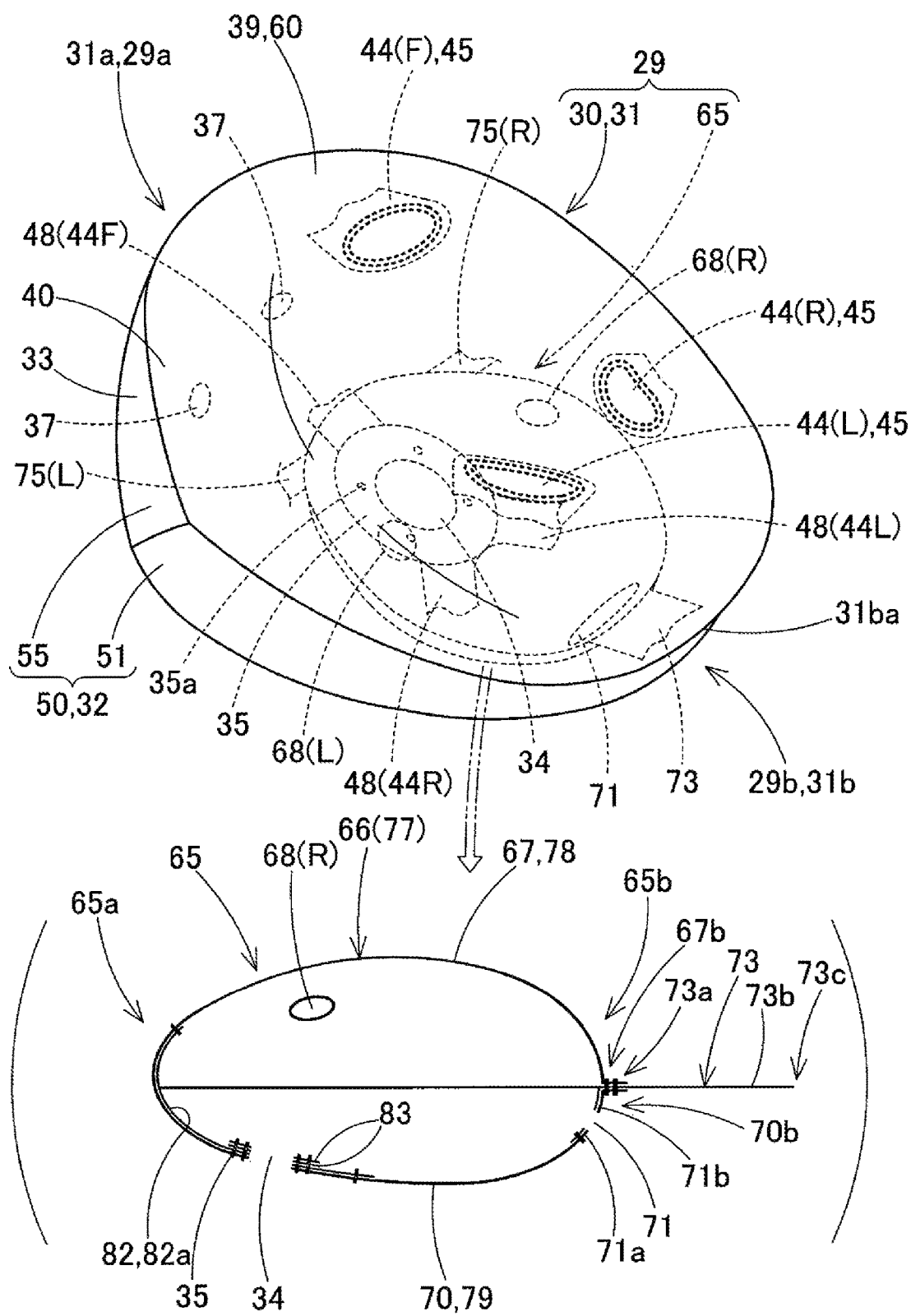
FIG. 3 is a schematic perspective view showing a state in which an airbag of the airbag device according to the embodiment is inflated alone.
Figure 14A:
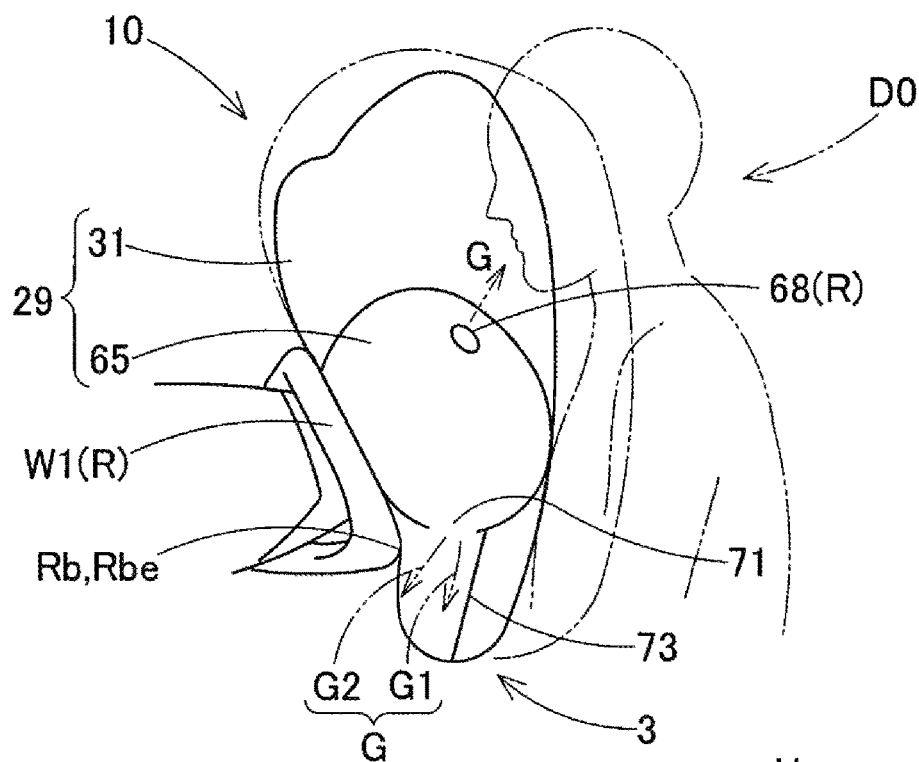
FIG. 14A and FIG. 14B show the airbag device according to the embodiment during the operation, and show a case where the occupant sits in a normal position.
Figure 14B:
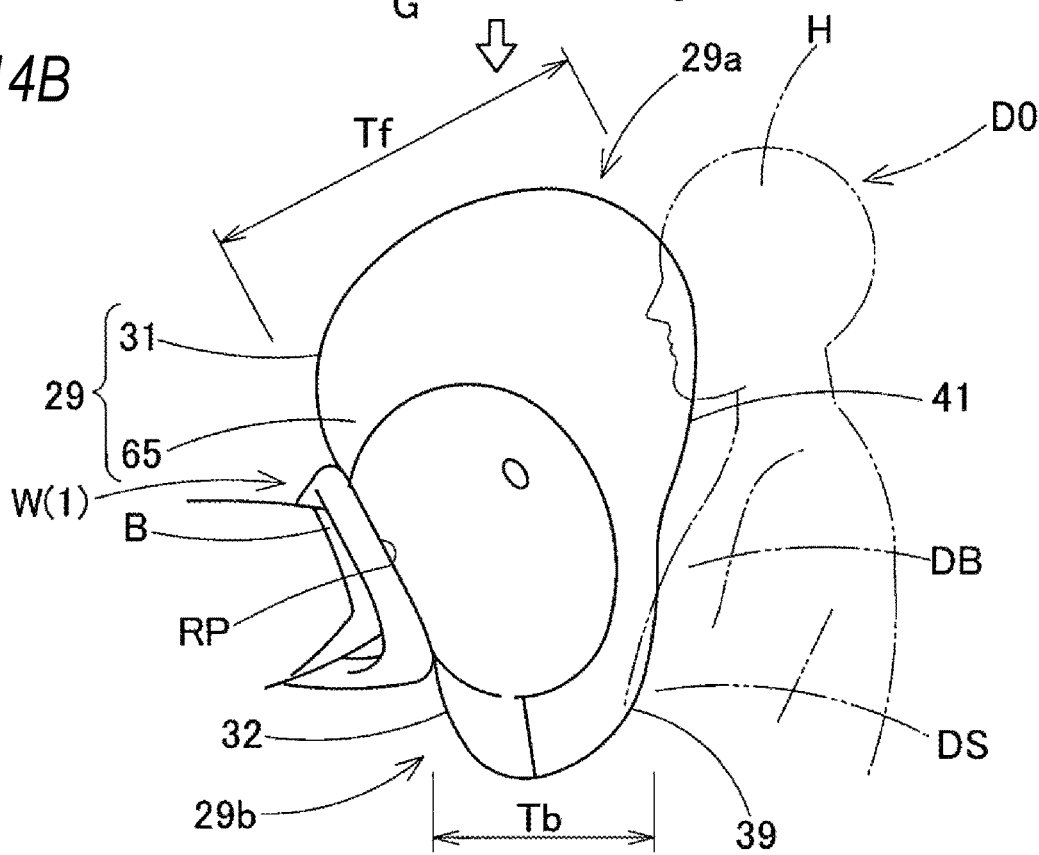

As shown by two-dot chain lines in FIGS. 1 and 2 and FIG. 14B, at a time of inflation completion, the airbag 29 is inflated to have an outer diameter dimension exceeding the front portion Rf and the rear portion Rh, further exceeding a left portion Rl and a right portion Rr of the ring portion R such that the vehicle body side wall portion 32 is supported by the ring surface RP of the ring portion R, and further has a substantially circular plate inflation completion shape (a substantially elongated circular plate shape that is long in the longitudinal direction) in which a thickness dimension Tf on a front portion 29a side is larger than a thickness dimension Tb on a rear portion 29b side. An outer peripheral wall 30 of the airbag 29 is constituted by an outer bag 31, and as shown in FIGS. 2 and 3, the outer peripheral wall 30 includes the vehicle body side wall portion 32 that is provided with the inflow opening 34 for allowing the inflation gas G to flow in the vicinity of a center thereof and is supported on the ring surface RP side of the ring portion R at the time of inflation completion of the airbag 29, and an occupant side wall portion (driver side wall portion) 39 that is disposed so as to close an upper side of the inflow opening 34 by connecting an outer peripheral edge 40 thereof to an outer peripheral edge 33 of the vehicle body side wall portion 32 and to face the vehicle body side wall portion 32.

A peripheral edge of the inflow opening 34 of the vehicle body side wall portion 32, which opens in a circle shape, serves as an attachment portion 35 to the bag holder 11, and four through holes 35a through which the bolts 27 of the retainer 25 pass are formed in the attachment portion 35 (see FIGS. 2, 3, 4, 8A and 8B). An inner surface of the attachment portion 35 is in contact with a lower surface side of the retainer 25, and the attachment portion 35 is a substantially rectangular annular portion fixed to the attachment seat 12c of the bag holder 11. Further, vent holes 37 and 37 (see FIGS. 3 and 4) are disposed on a front portion side of the vehicle body side wall portion 32.

The airbag 29 includes the outer bag 31 constituting the outer peripheral wall 30 at the time of inflation completion, and an inner bag 65 that is disposed so as to inflate inside the outer bag 31 and has supply ports 68 (L,R) and 71 through which the inflation gas G can be supplied to the outer bag 31. The outer bag 31 and the inner bag 65 share the inflow opening 34 and the attachment portion 35 having the through holes 35a. Further, in a case of the embodiment, three tethers 44 (F, L, and R) for regulating a separation distance from the inflow opening 34 at the time of inflation completion are disposed in the outer bag 31. Tethers 73 and 75 (L and R) that couple the inner bag 65 and the outer bag 31 are further disposed in the outer bag 31. The tether 73 is a gas guide tether that guides the inflation gas G flowing out of a lower side supply port 71 to be described later downward toward the vehicle body side wall portion 32 side, and the tethers 75 (L and R) serve as displacement prevention tethers that prevent the inner bag 65 from being displaced in the outer bag 31.

Figure 4:
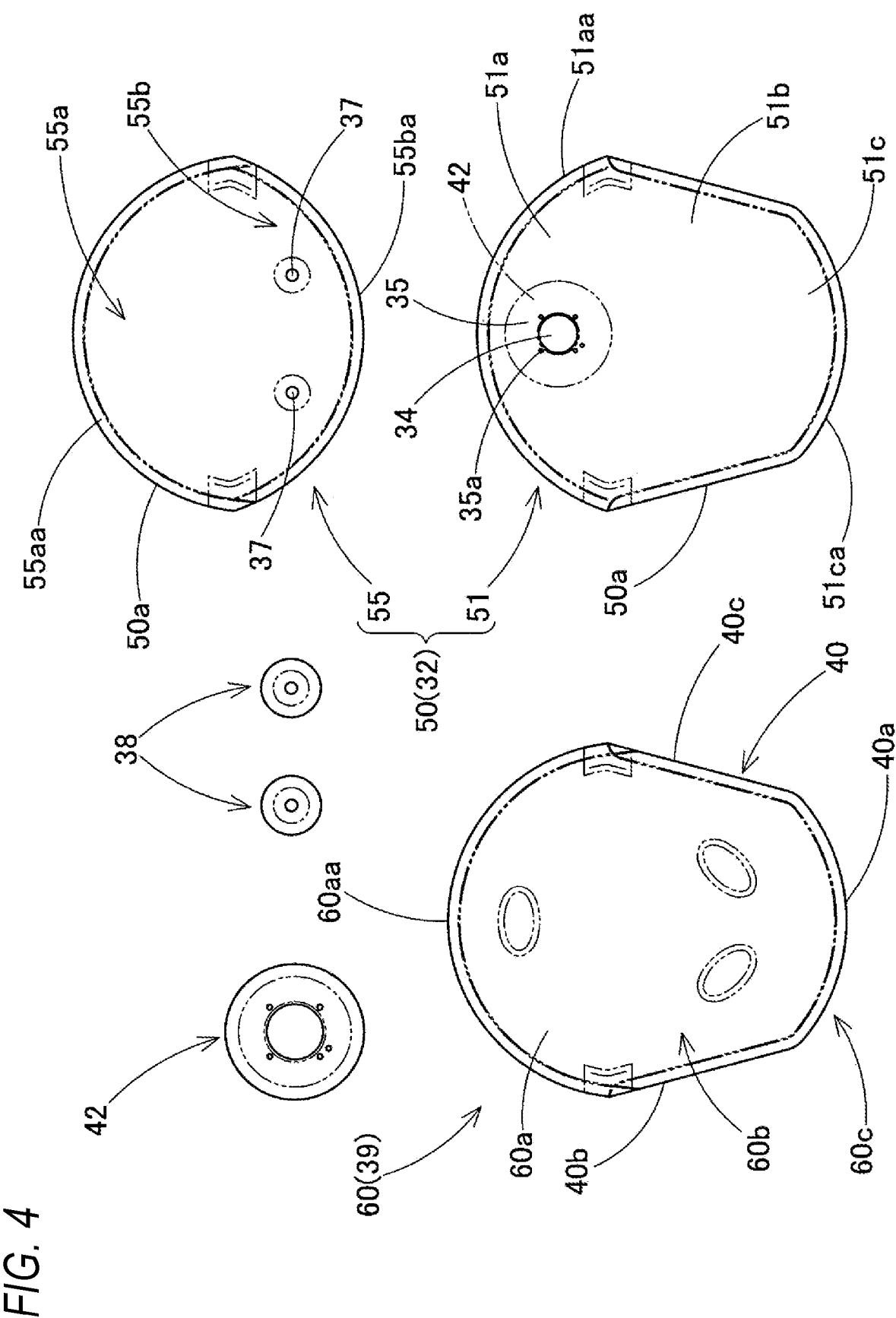
FIG. 4 is a plan view showing a constituent material of an outer bag in the airbag of the airbag device according to the embodiment.
Figure 5:
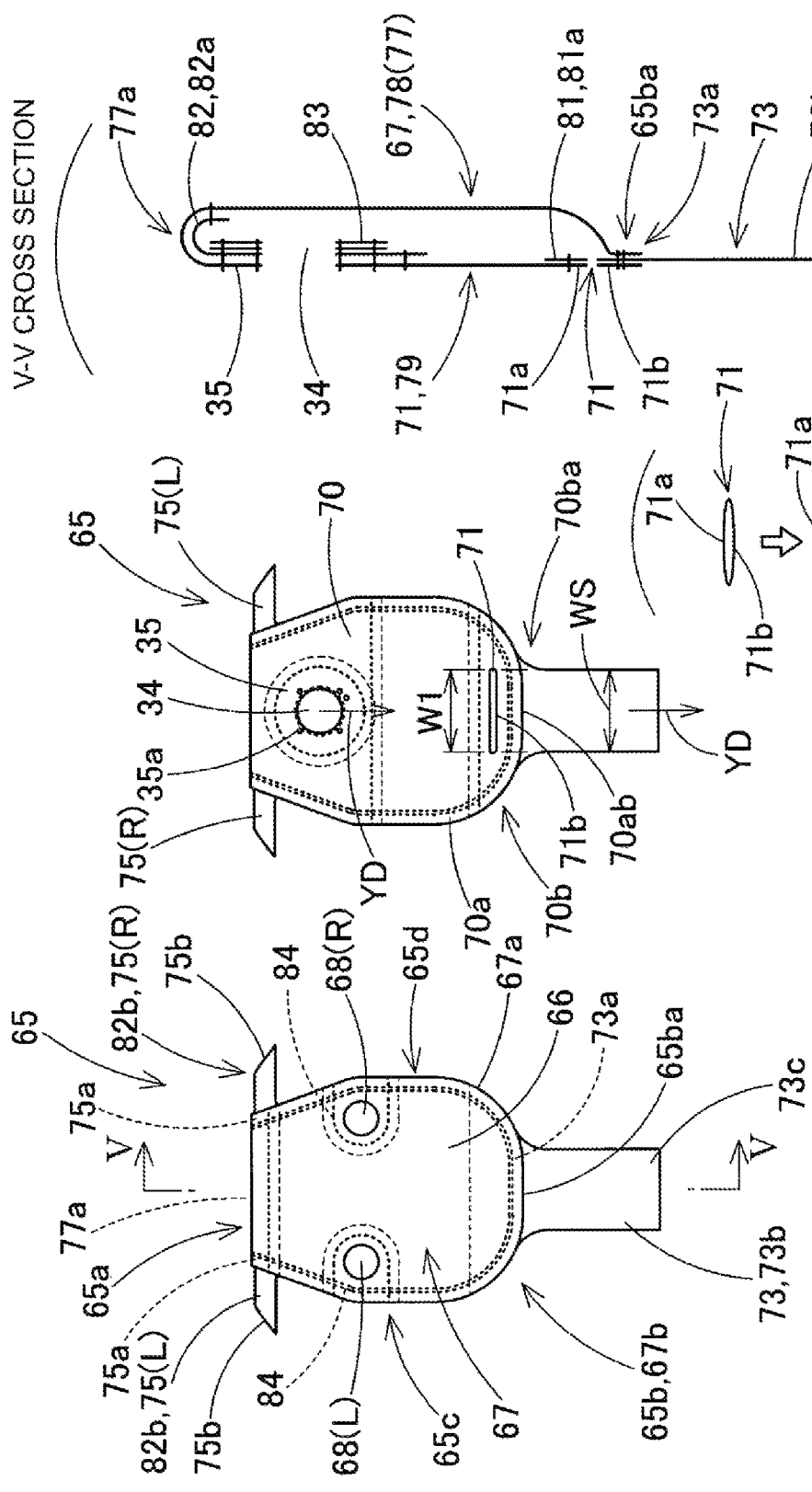
FIGS. 5A and 5B are a plan view and a bottom view showing an inner bag of the airbag of the airbag device according to the embodiment.
FIG. 5C is a cross-sectional view thereof.

As shown in FIG. 4, a base cloth forming the outer bag 31 includes an occupant side base cloth (driver side base cloth) 60 forming the occupant side wall portion 39 and a vehicle body side base cloth 50 forming the vehicle body side wall portion 32. Further, the vehicle body side base cloth 50 includes a rear side base cloth 51 having the inflow opening 34, and a front side base cloth 55 that joins an arc portion 55ba on a rear edge side to an arc portion 51aa on a front edge side of the rear side base cloth 51. In addition to base cloths 77, 81, and 82 of the inner bag 65, which will be described later, and a base cloth forming the tether 44, these base cloths 60, 51, and 55 are formed of a bag base cloth made of synthetic fiber such as polyamide or polyester.

The occupant side base cloth 60 has a substantially rectangular shape including a bow-shaped front portion 60a, an intermediate portion 60b having a substantially trapezoidal shape narrowed rearward, and a bow-shaped rear portion 60c.

The rear side base cloth 51 of the vehicle body side base cloth 50 has a substantially elongated shape including a bow-shaped front portion 51a, an intermediate portion 51b having a substantially trapezoidal shape narrowed rearward, and a bow-shaped rear portion 50c. The middle portion 51b and the rear portion 50c of the rear side base cloth 51 have substantially the same shapes as those of the middle portion 60b and the rear portion 60c of the occupant side base cloth 60.

The front side base cloth 55 of the vehicle body side base cloth 50 includes, as a substantially elliptical shape provided with a long axis in the horizontal direction, a bow-shaped front portion 55a having substantially the same shape as the front portion 60a of the occupant side base cloth 60, and a bow-shaped rear portion 55b having substantially the same shape as the front portion 51a of the rear side base cloth 51. The front portion 55a of the front side base cloth 55 serves as a front edge side of the vehicle body side wall portion 32 in the outer peripheral wall 30 of the airbag 29 at the time of inflation completion, and is joined (sewn) to an outer peripheral edge (front edge 60aa) of the front portion 60a of the occupant side base cloth 60, and a rear edge 55ba of the rear portion 55b of the front side base cloth 55 is joined (sewn) to an outer peripheral edge (front edge 51aa) of the front portion 51a of the rear side base cloth 51 of the vehicle body side base cloth 50.

Further, the vent holes 37 and 37 are opened in the rear portion 55b of the front side base cloth 55.

Figure 7:
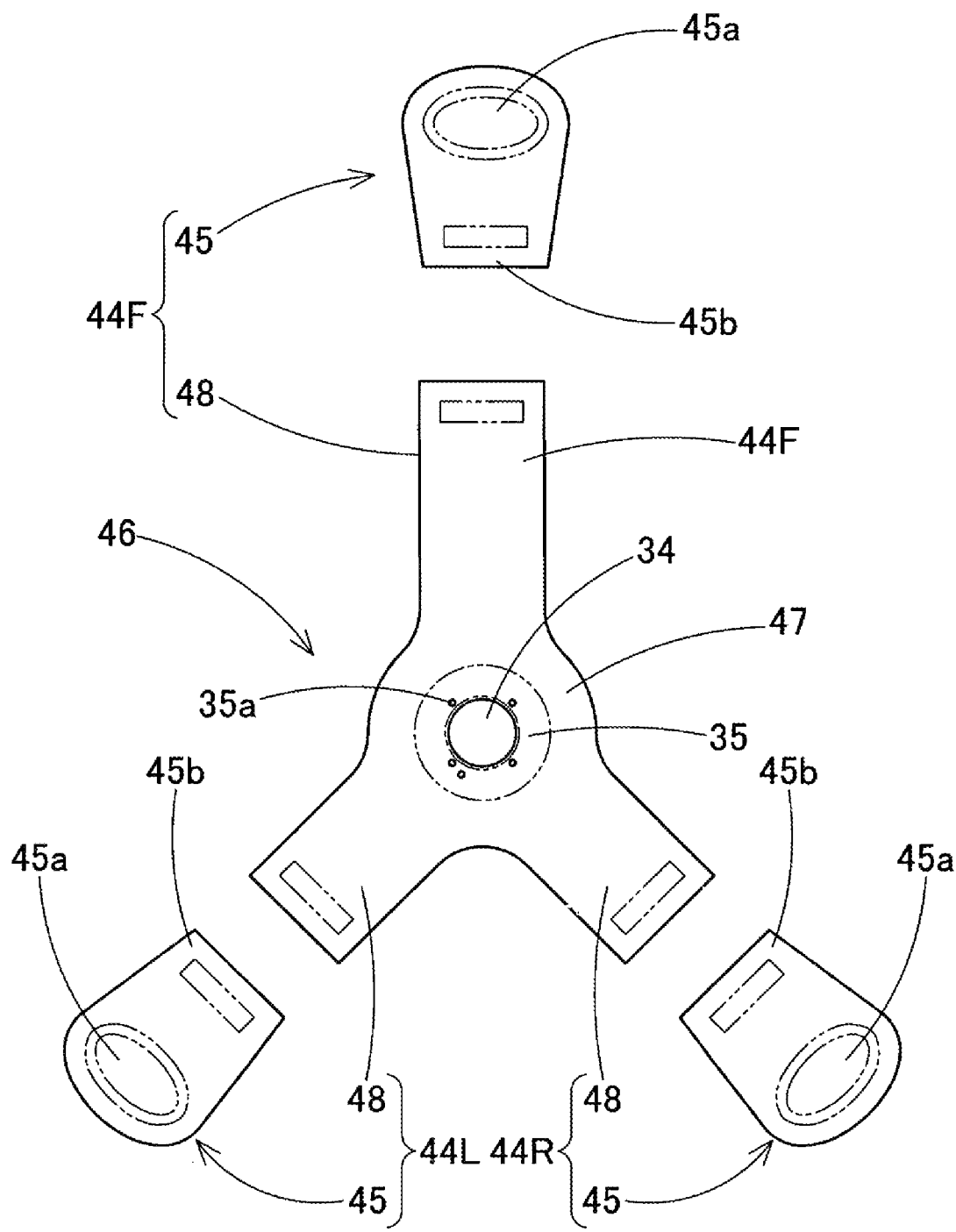
FIG. 7 shows a tether for height regulation used in the airbag in the airbag device according to the embodiment.

In the outer bag 31, the three tethers 44 (F, L, and R) for regulating a height of the occupant side wall portion 39 at the time of inflation completion are disposed around the inflow opening 34. The tether 44F is disposed so as to extend forward from the inflow opening 34, and the tethers 44L and 44R are disposed so as to extend radially from left and right sides on a rear side of the inflow opening 34. As shown in FIG. 7, the tethers 44 include three upper side portions 45 coupled to the occupant side wall portion 39 side, and a lower side portion 46 including three arm portions 48 extending from an attachment base portion 47 on the peripheral edge of the inflow opening 34 of the vehicle body side wall portion 32, and are formed by connecting the corresponding arm portions 48 of the lower side portion 46 and the upper side portions 45. An upper end 45a side of each of the upper side portions 45 is joined to the occupant side wall portion 39 side, and a lower end 45b side thereof is joined to a distal end of each of the arm portions 48. The attachment base portion 47 of the lower portion 46 is sewn to the peripheral edge of the inflow opening 34, and the arm portions 48 extending radially from the inflow opening 34 are joined to the lower ends 45b of the upper side portions 45 to form the tethers 44F, 44L, and 44R. A length dimension of each of the arm portions 48 of the lower side portion 46 is set corresponding to each of the tethers 44 (F, L, and R) such that the tether 44F on the front side is formed longer than the tethers 44L and 44R on the left and right sides.

On the front portion 29a side at the time of inflation completion of the airbag 29 (the outer bag 31), the front side base cloth 55 of the vehicle body side wall portion 32 is disposed on a front side of the inflow opening 34, and since a film length of the vehicle body side wall portion 32 in the longitudinal direction is longer than that of the occupant side wall portion 39, the vehicle body side wall portion 32 swells thickly. Since the short tethers 44L and 44R are disposed on the rear portion 29h side, and the thickness dimension Tb on the rear portion 29b side is regulated, the thickness dimension Tf on the front portion 29a side is thicker than the thickness dimension Tb on the rear portion 29b side when the inflation on the ring surface RP side of the ring portion R is completed (see FIG. 14B). When the inflation of the airbag 29 is completed, a driver D0 can be received by a receiving surface 41 of the occupant side wall portion 39 disposed along the substantially vertical surface.

The inner bag 65 includes an upper side wall portion 67 in which an outer peripheral wall 66 at the time of inflation completion faces the occupant side wall portion 39 of the outer bag 31, and a lower side wall portion 70 whose outer peripheral edge 70a is connected to an outer peripheral edge 67a of the upper side wall portion 67, that faces the vehicle body side wall portion 32, and in which the inflow opening 34 and the attachment portion 35 having the through holes 35a are disposed (see FIGS. 3, 5A, 5B and 5C). When the inner bag 65 is flatly deployed, the upper side wall portion 67 and the lower side wall portion 70 have the same outer shape, and the inner bag 65 has a substantially rectangular shape elongated in the longitudinal direction in which a width dimension in the horizontal on a front portion 65a side is narrower than that on a rear portion 65b side.

A lower side supply port 71 through which the inflation gas G flows toward the outer bag 31 is disposed in a rear portion 70b of the lower side wall portion 70. The lower side supply port 71 has an opening shape in which an opening width in the horizontal direction is larger than that in the longitudinal direction in a state in which the lower side wall portion 70 is flatly developed. When the inflation gas G flow in the inner bag 65 and is supplied to the outer bag 31 from the lower side supply port 71, a front edge 71a and a rear edge 71b facing each other in front and rear portions of the lower side supply port 71 are deformed into a semicircular arc shape (see parentheses in FIG. 5B), and the lower side supply port 71 is formed into a substantially circular opening shape to supply the inflation gas G. That is, the lower side supply port 71 changes from an elongated opening shape in which the opening width in the longitudinal direction in the flatly deployed state is reduced and a width dimension W1 in the horizontal direction is increased to a substantially circular opening shape in which a width dimension W2 in the horizontal direction when the inner hag 65 is inflated is reduced but an opening area is increased.

On both left and right sides of the upper side wall portion 67, upper side supply ports 68 (L and R) opened in a circular shape are disposed at positions on a front side of the lower side supply port 71.

The opening area when supplying the inflation gas G is set such that the opening area of the lower side supply port 71 (the opening area of the lower side supply port 71 opened in the substantially circular shape) is larger than a total opening area of the upper side supply ports 68L and 68R at a time of opening. Incidentally, an area ratio of the lower side supply port 71 and the upper side supply ports 68L and 68R at the time of opening is set to about 3:1:1).

In the case of the embodiment, the upper side wall portion 67 and the lower side wall portion 70 are formed of one piece of the inner bag base cloth 77 (see FIG. 6), the inner bag base cloth 77 is folded in two with a fold 77a, and an overlapped upper side portion 78 constitutes the upper side wall portion 67, and an overlapped lower side portion 79 constitutes the lower side wall portion 70. The inner bag 65 is formed by attaching the fold 77a to the inner bag base cloth 77 and sewing together outer peripheral edges 78a and 79a of the overlapped upper side portion 78 and lower side portion 79 except for the fold 77a. When the outer peripheral edges 78a and 79a are sewn together, the tethers 73 and 75, that is, the guide base cloth 81 and the displacement prevention base cloth 82 forming the gas guide tether 73 and the displacement prevention tethers 75 (L and R) are simultaneously sewn together to couple the gas guide tether 73 and the displacement prevention tethers 75 (L and R) to the inner bag 65.

Figure 6:
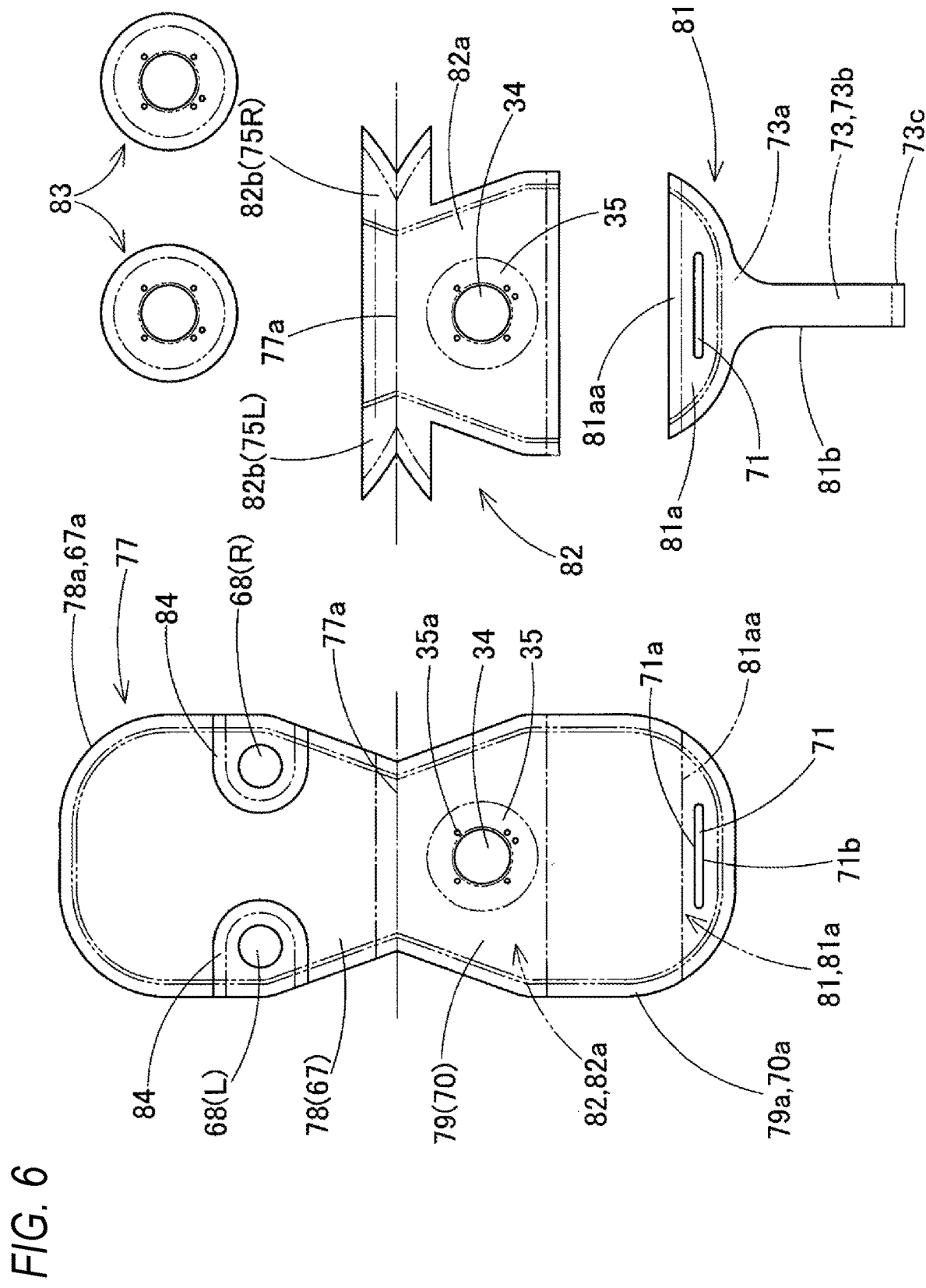
FIG. 6 is a plan view showing constituent materials of the inner bag, a gas guide tether, and displacement prevention tethers of the airbag device according to the embodiment.

As shown in FIG. 6, the guide base cloth 81 includes a reinforcing portion 81a that reinforces the peripheral edge of the lower side supply port 71 and an arm portion 81b forming the gas guide tether 73, the reinforcing portion 81a is sewn between the lower side portion 79 and the upper side portion 78 when the outer peripheral edges 78a and 79a are sewn to each other by sewing a front edge 81aa side of the reinforcing portion 81a to the peripheral edge of the lower side supply port 71 of the lower side portion 79 and then overlapping the upper side portion 78 on the lower side portion 79. Then, the arm portion 81b forming the gas guide tether 73 is disposed so as to extend rearward from a rear end portion 65ba of the inner bag 65.

In the gas guide tether 73 formed of the arm portion 81b, a base portion 73a is joined to a rear edge 70ab of the lower side wall portion 70 on a rear edge 71b side serving as an outer edge side of the lower side supply port 71, and a distal end portion 73c extending rearward from the base portion 73a is joined to rear edges 33a and 40a when the outer peripheral edge 33 of the vehicle body side wall portion 32 and the outer peripheral edge 40 of the occupant side wall portion 39 of the outer bag 31 are sewn together in the case of the embodiment. An intermediate portion 73b between the base portion 73a and the distal end portion 73c of the gas guide tether 73 has a band shape, and a width dimension WS thereof in the horizontal direction is set within a range from the minimum width dimension W2 to the maximum width dimension W1 of the lower side supply port 71 such that the inflation gas G flowing out from the lower side supply port 71 can be guided to the vehicle body side wall portion 32 side. In the case of the embodiment, the width dimension WS of the intermediate portion 73b is equal to the maximum width dimension W1 (about 120 mm) of the lower side supply port 71. When the inner bag 65 is accommodated in the outer bag 31 and deployed flat, the gas guide tether 73 extends from the vicinity of the outer edge (rear edge) 71b of the lower side supply port 71 toward the rear edge 33a side of the outer bag 31 along a direction YD extending rearward along a radial direction centered on the inflow opening 34 (see FIGS. 8A and 8B).

The displacement prevention base cloth 82 includes an attachment base portion 82a sewn to the peripheral edge of the inflow opening 34 by sewing reinforcing cloths 83 disposed at the peripheral edge of the inflow opening 34, and arm portions 82b extending from the attachment base portion 82a to both left and right sides. In the left and right arm portions 82b, the attachment base portion 82a is overlapped with the vicinity of the fold 77a of the inner bag base cloth 77. Then, when the inner bag base cloth 77 is folded at the fold 77a, the lower side portion 79 and the upper side portion 78 are overlapped with each other, and the outer peripheral edges 79a and 78a are sewn together the arm portions 82b protruding from the outer peripheral edges 79a and 78a are both folded at the fold 77a and sewn together when the outer peripheral edges 79a and 78a are sewn together to form the displacement prevention tethers 75 (L and R).

The displacement prevention tethers 75 (L and R) are in a state in which base portions 75a are joined to front ends of left and right edges 65c and 65d of the inner bag 65, and distal end portions 75b extending from the base portion 75a are joined to a front left edge portion 51ab and a front right edge portion 51ac of the rear side base cloth 51 coupled to the front side base cloth 55 of the outer bag 31.

In the manufacturing of the airbag 29, first, the inner bag 65 is manufactured, and the manufactured inner bag 65 is assembled to the outer bag 31 at a time of manufacturing the outer bag 31 to manufacture the airbag 29.

In the manufacturing of the inner bag 65, the guide base cloth 81, the displacement prevention base cloth 82, and the reinforcing cloths 83 and 84 are sewn to the inner bag base cloth 77 in a state in which the inflow opening 34 and the supply ports 68 and 71 are not formed, and hole-opening processing is performed on the inner bag base cloth 77 to form the inflow opening 34 and the supply ports 68 and 71. Then, the inner bag base cloth 77 is folded at the fold 77a, the outer peripheral edges 78a and 79a of the overlapped upper side portion 78 and lower side portion 79 are sewn to each other, and thereby the inner bag 65 to which the gas guide tether 73 and the displacement prevention tethers 75 (L and R) are attached can be formed.

The outer bag 31 is manufactured by sewing a reinforcing cloth 42 and the lower side portion 46 of the tether 44 to the rear side base cloth 51 of the vehicle body side base cloth 50 in a state in which the inflow opening 34 and the through holes 35a are not provided, and performing the hole-opening processing to form the inflow opening 34 and the through holes 35a. Further, reinforcing cloths 38 for vent holes are sewn to the front side base cloth 55 of the vehicle body side base cloth 50 in a state in which the vent holes 37 are not provided, and the hole-opening processing is performed to form the vent holes 37. Each of the upper ends 45a of the upper side portions 45 of the tethers 44 is sewn to the occupant side base cloth 60.

Then, the inner hag 65 is disposed on an inner surface side of the vehicle body side base cloth 50 with the inflow opening 34 and the through hole 35a aligned with each other, and the arc portion 55ha on a rear edge side of the front side base cloth 55 and the arc portion 51aa on a front edge side of the rear side base cloth 51 are sewn together with the distal end portions 75b while the distal end portions 75b of the displacement prevention tethers 75L and 75R are disposed at predetermined positions on the left and right sides of the arc portion (front edge) 51aa of the rear side base cloth 51, thereby forming the vehicle body side base cloth 50. Then, outer surface sides of the vehicle body side base cloth 50 and the occupant side base cloth 60 are aligned with each other, the distal end portion 73c of the gas guide tether 73 extending from the inner bag 65 is disposed at a rear edge 51ca of the vehicle body side base cloth 50, outer peripheral edges of the intermediate portions 51b and 60b and the rear portions 51c and 60c of the rear side base cloth 51 and the occupant side base cloth 60 are sewn together with the distal end portion 73c. The outer bag 31 can be formed by sewing an arc portion 55aa on the front edge side of the front side base cloth 55 and an arc portion 60aa on the front edge side of the occupant side base cloth 60 together, and the inner bag 65 can be coupled to the outer bag 31 via the tethers 73 and 75. Thereafter, the outer bag 31 is reversed in a state in which the inner bag 65 is overlapped on the vehicle body side base cloth 50 by using the inflow opening 34 such that seam allowance is not exposed to the outer surface side, then the lower end 45b of each of the upper side portions 45 and each of the arm portions 48 of the lower side portion 46 of the tether 44 are pulled out and joined by sewing by using the inflow opening 34, and then respective joint portions are accommodated in the outer bag 31, whereby the manufacturing of the airbag 29 can be completed.

Then, in the airbag 29 manufactured in this way, in a state in which the inflow opening 34 and the through holes 35a are aligned with each other by using the retainer 25, and the inner bag 65 is disposed in the outer bag 31, the folding preparation body 85 in which the airbag 29 is flatly deployed is formed so as to form the completely folded body 90. The folding preparation body 85 is formed by forming a fold 87 in the horizontal direction in a region of the front side base cloth 55 of the vehicle body side wall portion 32 and providing a folding portion 86 that overlaps an upper side of the inner bag 65.

Figure 10:
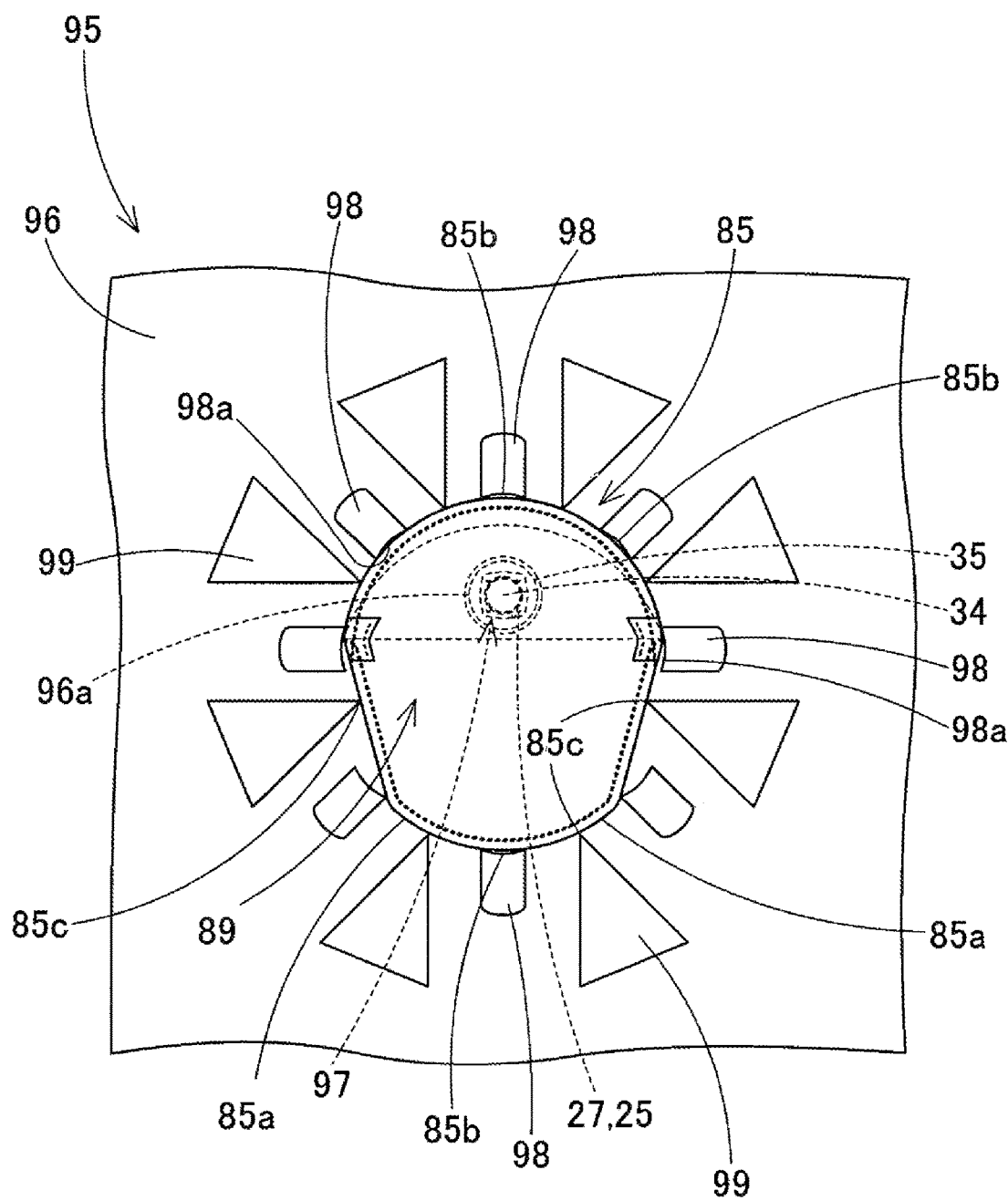
FIG. 10 is a schematic plan view showing radial folding for forming a completely folded body of the airbag according to the embodiment.
Figure 11A:
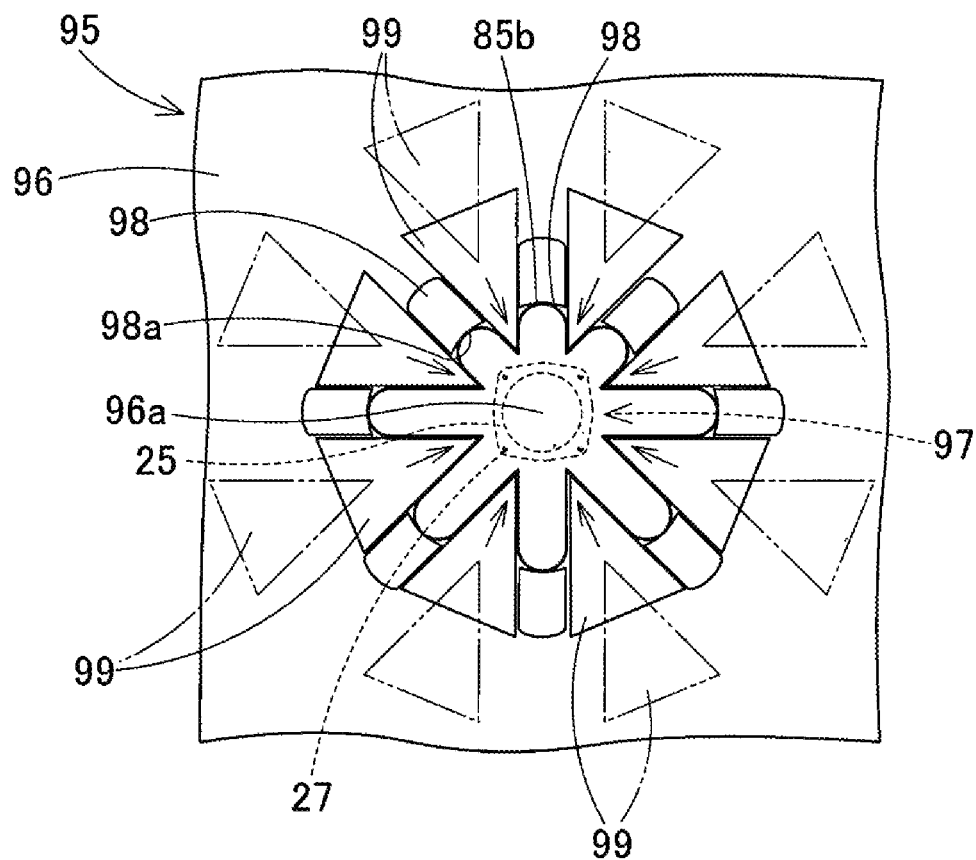
FIG. 11A and FIG. 11B are schematic plan views showing the radial folding for forming the completely folded body of the airbag according to the embodiment, and show a process after FIG. 10.
Figure 11B:
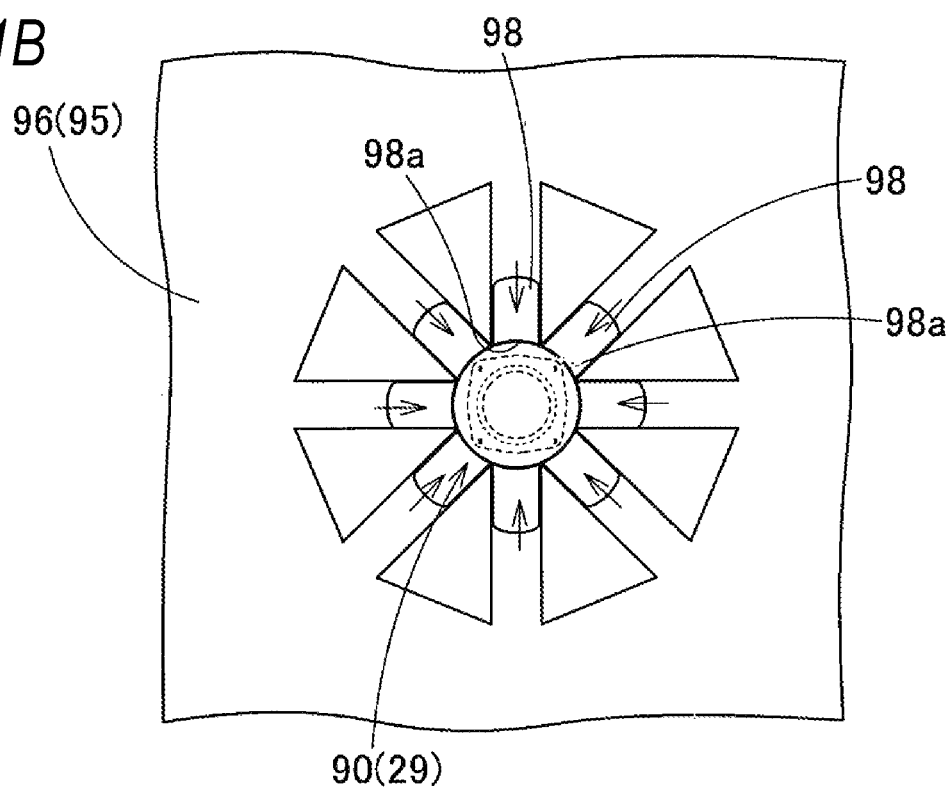

When the folding preparation body 85 is folded into the completely folded body 90, the folding preparation body 85 is radially folded as shown in FIG. 10 and FIGS. 11A and 11B. The radial folding is a folding method in which a plurality of positions (16 positions radially arranged from the inflow opening 34 in the embodiment) extending from the inflow opening 34 to an outer peripheral edge 85a side in the folding preparation body 85 are brought close to the inflow opening 34 side, and a substantially annular peripheral edge portion 89 extending from the inflow opening 34 to the outer peripheral edge 85a side in the folding preparation body 85 is collected on an upper side of the inflow opening 34.

As shown in FIGS. 10 and 11A and 11B, a bag folding machine 95 used for the radial folding is configured by arranging two types of eight pushing tools 98 and 99 that move to a center side of a bottom side base plate 96 around the bottom side base plate 96. A setting portion 97 into which each of the bolts 27 of the retainer 25 protruding from the folding preparation body 85 is fitted is disposed in a center 96a on an upper surface side of the bottom side base plate 96.

The pushing tools 98 can grip eight portions 85b on the outer peripheral edge 85a of the folding preparation body 85 and can be pushed toward the center 96a side (see FIGS. 11A and 11B). Further, a die surface 98a corresponding to an arc-shaped curved surface of a substantially columnar outer peripheral surface of the completely folded body 90 is formed on the setting portion 97 side of the pushing tools 98. The pushing tools 99 have a substantially triangular plate shape with the setting portion 97 side tapered.

A ceiling side substrate (not shown) is disposed above the bottom side base plate 96 such that a height dimension of the folding preparation body 85 can be regulated and the substantially columnar completely folded body 90 can be formed when the pushing tools 98 and 99 are pushed.

Then, when the bag folding machine 95 is used, the bolts 27 of the folding preparation body 85 are set in the setting portion 97, then the ceiling side substrate (not shown) is disposed at a position at a predetermined height (equal to a height dimension of the completely folded body 90) from the setting portion 97 of the bottom side base plate 96, and as shown in FIG. 10, the pushing tools 98 and 99 are moved to the setting portion 97 side, and the pushing tools 98 grip the predetermined eight portions 85b of the outer peripheral edge 85a of the folding preparation body 85. Thereafter, as shown in FIG. 11A, first, each of the pushing tools 99 is moved to the setting portion 97 side (inflow opening 34 side), and eight pushing portions 85c of the outer peripheral edge 85a of the folding preparation body 85 are pushed to the setting portion 97 side while leaving a region of the folding preparation body 85 on the setting portion 97 side of the pushing tools 98. Thereafter, when the gripping of the gripping portions 85b of the outer peripheral edge 85a of each of the pushing tools 98 is released, each of the pushing tools 98 is moved to the setting portion 97 side, and the eight portions 85b are pushed to the setting portion 97 side as shown in FIG. 11B, the substantially columnar completely folded body 90 can be formed.

In order to maintain the folded shape, the completely folded body 90 radially folded in this way is first subjected to heat compression molding by a heated pressing die, and further subjected to cooling compression molding by a pressing die at a room temperature, thereby preventing folding collapse.

After processing of preventing the folding collapse is performed, the completely folded body 90 is wrapped with a wrapping material (not shown), and the airbag device 10 is assembled. At a time of assembly, the completely folded body 90 is fitted to an inner peripheral surface side of the side wall portion 22 of the airbag cover 20, the bolts 27 extending from the completely folded body 90 passes through the through holes 12b of the bag holder 11, the side wall portion 22 of the airbag cover 20 is locked to the bag holder 11, and the side wall support portion 13 of the bag holder 11 and the side wall portion 22 of the airbag cover 20 are coupled to each other using the rivet 23. Thereafter, while the main body portion 16 of the inflator 15 is inserted into the insertion hole 12a of the bag holder 11 from below, the bolts 27 protruding from the bag holder 11 passes through the flange portion 17 of the inflator 15, and nuts (not shown) are fastened to the bolts 27, whereby the completely folded body 90 and the inflator 15 are attached and fixed to the bag holder 11 to which the airbag cover 20 is attached, and the airbag device 10 is assembled.

When the airbag device 10 is to be mounted on the vehicle, the airbag device 10 can be mounted on the steering wheel main body 1 by fastening an attachment bracket (not shown) extending from the bag holder 11 to the steering wheel main body 1 that is assembled to the steering shaft SS, assembly of the steering wheel W is completed, and the steering wheel W can be mounted on the vehicle together with the airbag device 10.

When the airbag device 10 is attached to the steering wheel main body 1, a lead wire (not shown) for inputting operation signals is connected to the inflator 15.

After the inflator 15 is mounted on the vehicle, when the operation signals are input to the inflator 15, the inflator 15 discharges the inflation gas G from the gas discharge ports 16*a*, and thus the folded airbag 29 inflates because the inflation gas G flows therein, breaks the wrapping material (not shown), pushes and opens the door portions 21*a* of the ceiling wall portion 21 of the airbag cover 20, protrudes from openings of the door portions 21*a*, and deploys and inflates so as to cover an upper surface of the ring portion R from above the boss portion B (see two-dot chain lines in FIGS. 1 and 2).

Figure 9:
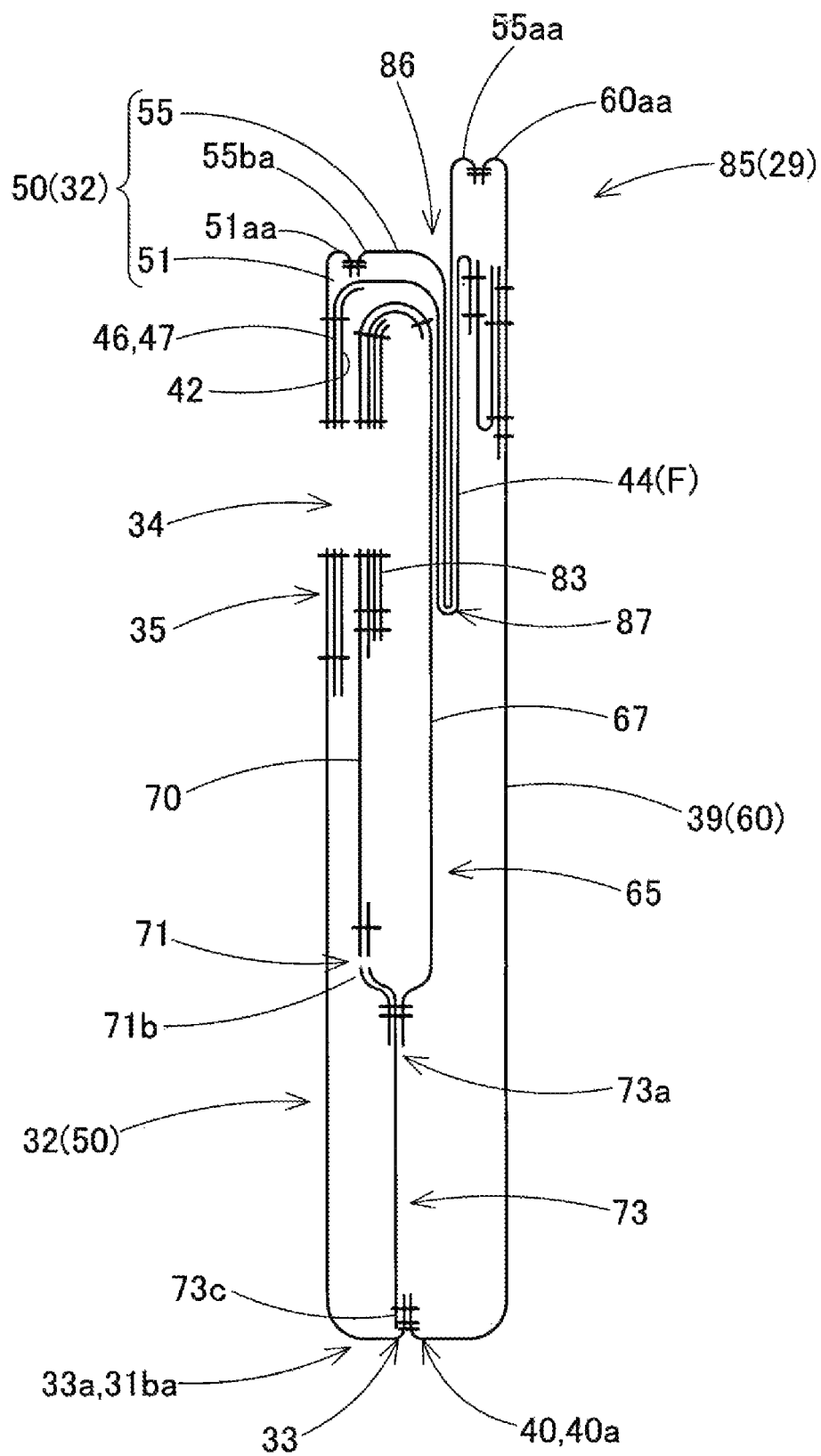
FIG. 9 is a schematic cross-sectional view of the folding preparation body, and corresponds to a portion taken along a line IX-IX in FIG. 8A.
Figure 12A:
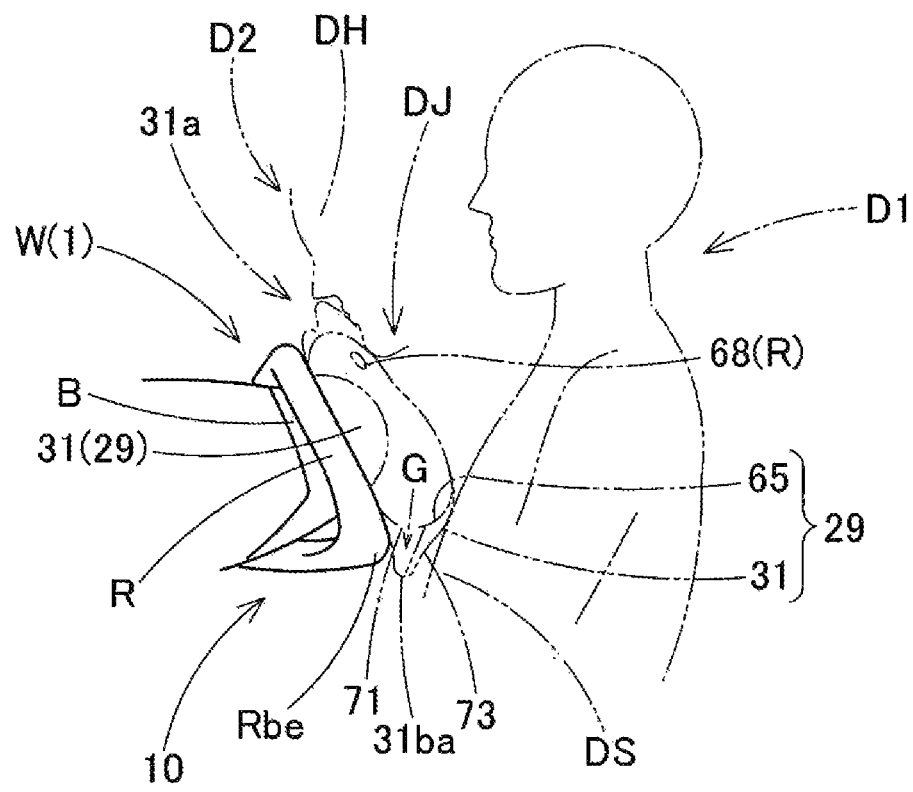
FIG. 12A and FIG. 12B show the airbag device according to the embodiment during operation, and show a case where an occupant is approaching the airbag device.
Figure 12B:
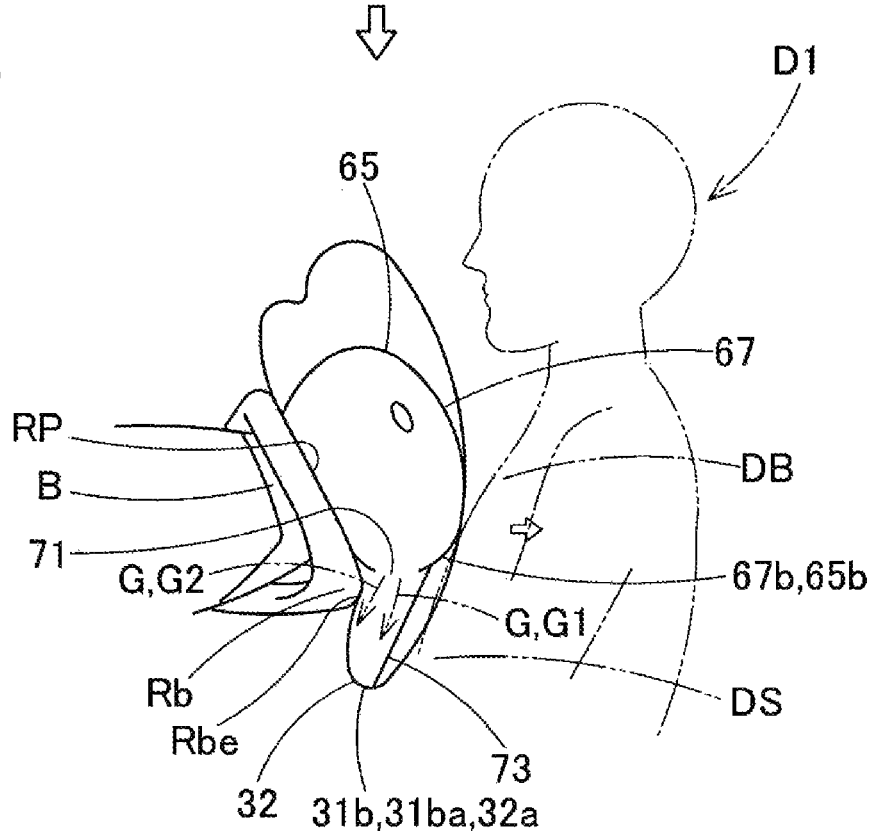

At this time, in the airbag device 10 according to the embodiment, first, as shown in FIGS. 12A and 12B, the inner bag 65 is inflated by the inflation gas G discharged from the gas discharge ports 16*a* of the inflator 15 (see FIG. 2), and the inflation gas G is supplied from the supply ports 68 (L and R) and 71 to the outer bag 31. At this time, in the vicinity of the lower side supply port 71 in which the gas guide tether 73 is disposed in the vicinity of the outer edge (rear edge 71*b*), inflation gas G1 flowing out from the lower side supply port 71 is guided by the gas guide tether 73 and flows toward the vehicle body side wall portion 32 in the outer bag 31. That is, the gas guide tether 73 is disposed so as to couple a portion in the vicinity of the rear edge 71*b* side serving as the outer edge of the lower side supply port 71 and the rear edge 33*a* side of the vehicle body side wall portion 32 along the radial direction YD centered on the inflow opening 34 of the inner bag 65. Therefore, even if inflation gas G2 flowing out from the lower side supply port 71 tries to flow out from the lower side supply port 71 toward the rear side along the radial direction YD coupling an arrangement position of the lower side supply port 71 from the inflow opening 34, the inflation gas G2 hits the gas guide tether 73 in which the distal end portion 73*c* side (see FIGS. 8A, 8B, and 9) is coupled to the vehicle body side wall portion 32 from the vicinity of the rear edge 71*b* side of the lower side supply port 71, and then flows, by being guided by the gas guide tether 73, so as to press a rear end portion 31*ba* of the outer bag 31 against the vehicle body side member W of the peripheral edge of the boss portion B serving as the accommodating portion, that is, against the vicinity of a rear end Rbe of the rear portion Rb in the ring portion R. Therefore, even when an occupant D1 approaches the rear end Rbe of the ring portion R, the rear end portion 31*ba* of the outer bag 31 can smoothly enter and inflate between the approaching occupant D1 and the rear end Rbe of the ring portion R of the steering wheel W as the vehicle body side member, and the occupant D1 can be protected.

The inflation gas G flowing out of the lower side supply port 71 of the inner bag 65 also has the inflation gas G2 directly hitting the vehicle body side wall portion 32 without hitting the gas guide tether 73 and flows so as to press the rear end portion 31*ba* of the outer bag 31 against the rear end Rbe of the ring portion R serving as the vehicle body side member of the peripheral edge of the accommodating portion, and a flow of the inflation gas G2 also can cause the rear end portion 31*ba* of the outer bag 31 to smoothly enter and inflate between the approaching occupant D1 and the rear end Rbe of the ring portion R. However, with the gas guide tether 73, it is possible to more effectively promote an action of pressing the rear end portion 31*ba* of the outer bag 31 against the rear end Rbe of the ring portion R of the vehicle body side member (steering wheel W) on the peripheral edge of the accommodating portion (boss portion B).

Figure 13A:
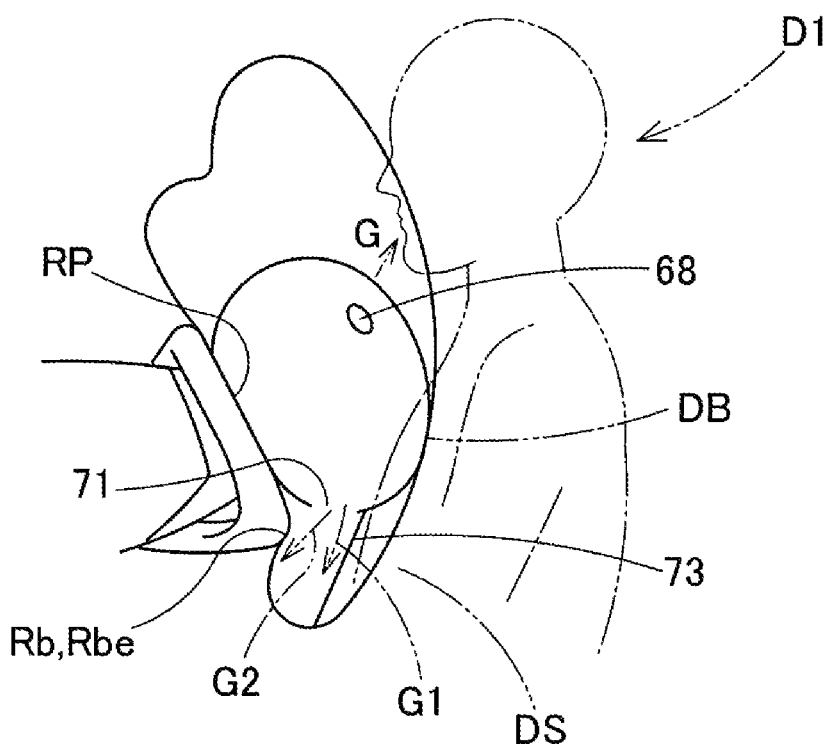
FIG. 13A and FIG. 13B show the airbag device according to the embodiment during the operation, and show states after FIG. 12A and FIG. 12B.
Figure 13B:
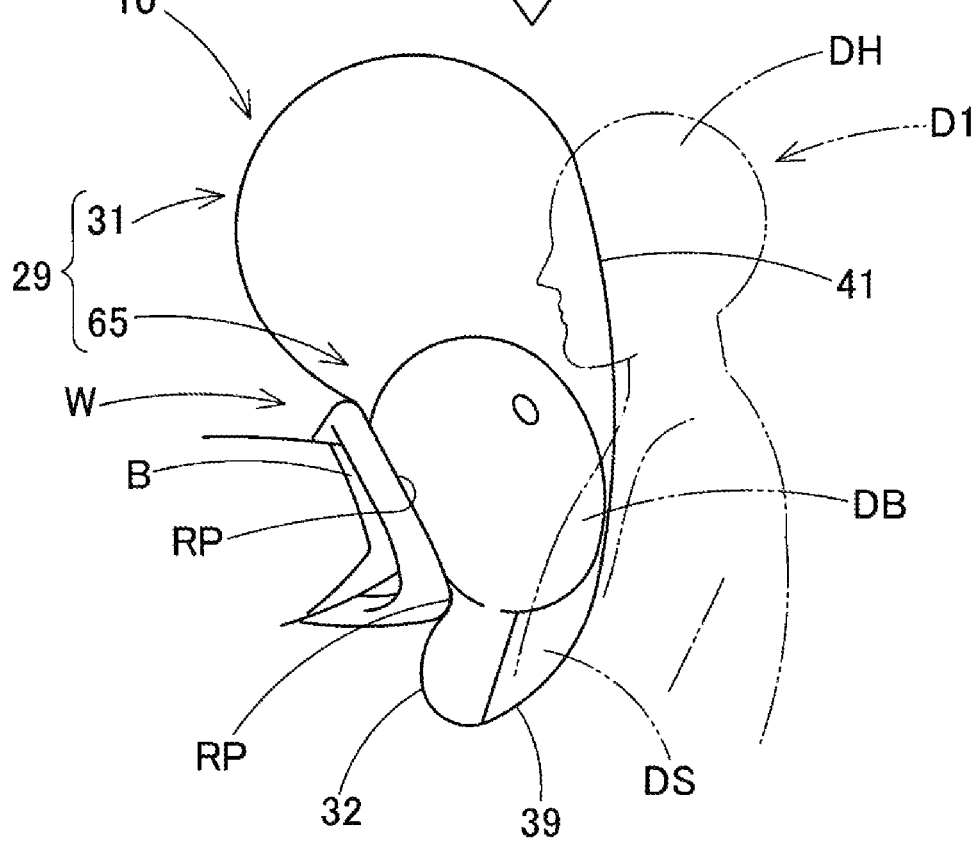

Thereafter, as shown in FIGS. 13A and 13B, the outer bag 31 is inflated by the inflation gas G from the supply ports 68 and 71 of the inner bag 65, the inflation can be completed so as to cover the ring surface RP including the rear end Rbe side of the ring portion R, and the occupant D1 is protected by the inflated outer bag 31 which is supported by the ring portion R.

Therefore, in the airbag device 10 according to the embodiment, even when the occupant D1 approaches the rear end Rbe of the ring portion R on the peripheral edge of the boss portion B serving as the accommodating portion in the steering wheel W serving as the vehicle body side member at the time of operation, the occupant D1 can be suitably protected by the inflated airbag 29.

As shown in FIGS. 14A and 14B, in a case of an occupant D0 in a normal position, when the airbag device 10 is operated, the inner bag 65 is inflated, and the inflation of the outer bag 31 is completed by receiving the inflation gas G supplied from the supply ports 68 and 71, whereby the occupant D0 is smoothly received and protected by the receiving surface 41 of the occupant side wall portion 39 of the outer bag 31 supported by the ring surface RP.

Further, in the airbag device 10 according to the embodiment, the gas guide tether 73 is disposed such that the distal end portion 73*c*, which is the coupling portion with the vehicle body side wall portion 32, is coupled to the connection portion between the outer peripheral edge 33 of the vehicle body side wall portion 32 and the outer peripheral edge 40 of the occupant side wall portion 39.

Therefore, the embodiment has a configuration in which the distal end portion 73*c* of the gas guide tether 73 on the outer bag 31 side is coupled to the connection portion between the outer peripheral edge 33 of the vehicle body side wall portion 32 and the outer peripheral edge 40 of the occupant side wall portion 39, and the inflation gas G flowing out from the lower side supply port 71 opened in the lower side wall portion 70 of the inner bag 65 can be accurately guided toward the vehicle body side wall portion 32 side rather than toward the occupant side wall portion 39 side. Further, the distal end portion 73*c* of the gas guide tether 73 on the outer bag 31 side is coupled to the connection portion between the outer peripheral edge 33 of the vehicle body side wall portion 32 and the outer peripheral edge 40 of the occupant side wall portion 39 and is coupled by suturing, as compared to a case where the distal end portion 73*c* is coupled to the single portion of the vehicle body side wall portion 32, gas leakage can be prevented, and the gas guide tether 73 can be coupled to the vehicle body side wall portion 32 side.

Further, the embodiment has a configuration in which the lower side supply port 71 is disposed on a rear end portion 70*ha* side of the inner bag 65 (see FIGS. 5A, 5B and 5C), and the supply port of the inner bag 65 includes the lower side supply port 71 and the upper side supply ports 68L and 68R disposed on both left and right sides of the upper side wall portion 67 on the front side of the lower supply port 71. Then, the lower side supply port 71 is disposed such that the opening area thereof at the time of opening is larger than the total opening area of the upper side supply ports 68L and 68R at the time of opening.

Therefore, in the embodiment, since the inflation gas G is supplied to the vehicle body side wall portion 32 side of the outer bag 31 from the lower side supply port 71 having a large opening area when the inner bag 65 is inflated, the upper side wall portion 67 of the inner bag 65, particularly a rear portion 67*b* side moves upward due to a reaction force for discharging the expansion gas G. This behavior causes the occupant D1 moving forward so as to approach the rear end Rbe of the ring portion R of the rear side peripheral edge of the boss portion B serving as the accommodating portion to be pressed rearward (refer to an arrow of FIG. 12B) at a time of operation, and thus the occupant D1 can be accurately pushed rearward so as to be separated from the ring portion R of the vehicle body side member (the steering wheel W), and the rear end portion 31ba side of the outer bag 31 easily enters between the ring portion R and the occupant D1. Further, the opening area of the lower side supply port 71 is set to be larger than the total opening area of the upper side supply ports 68L and 68R on both the left and right sides, whereby the inflation gas G can be made to flow quickly, the rear portion 65b side of the inner bag 65 can quickly push an occupant D approaching the vicinity of the rear end Rbe of the ring portion R rearward so as to be separated from the vicinity of the boss portion B, and further, inflation of a rear portion 31b side of the outer bag 31 can be promoted. Further, the upper side supply ports 68L and 68R are disposed on both the left and right sides of the upper side wall portion 67 of the inner bag 65 positioned in front of the lower side supply port 71, and as shown by a two-dot chain line in FIG. 12A, even when the vicinity of a jaw DJ of an occupant D2 approaches the airbag 29 on a front portion 31a side of the outer bag 31, the front portion 31a side of the outer bag 31 branches to both the left and right sides and the inflation gas G can be supplied thereto without directly applying the inflation gas G to the vicinity of the jaw DJ of the occupant D2, the vicinity of the jaw DJ of the approaching occupant D2 can be pushed by the outer bag 31 so as to be separated from the vicinity of the boss portion B, and the inflated outer bag 31 can be interposed between the vicinity of a head DH of the occupant D2 and the steering wheel W. Further, since the upper side supply ports 68L and 68R are opened in the lower side wall portion 70 provided with the lower side supply port 71 and the upper side wall portion 67 whose upper and lower sides are reversed, and a direction of the reaction force acting on the inner bag 65 is opposite to the lower side supply port 71 side, the inflation gas G can be supplied upward to the outer bag 31 side while maintaining a stable opening surface without deforming the upper wall portion 67 itself so as to float upward. As a result, the entire outer bag 31 can complete the inflation by the inflation gas G supplied from the lower side supply port 71 and the upper side supply ports 68L and 68R of the inner bag 65 in a well-balanced manner and receive the occupants D0, D1, and D2.

Further, in the embodiment, the displacement prevention tethers 75L and 75R extending outward from the vicinity of the outer peripheral edge 67a of the inner bag 65 and coupled to the outer bag 31 are disposed on both left and right sides of the front portion 65a side of the inner bag 65.

Therefore, in the embodiment, the left and right upper side supply ports 68L and 68R of the inner bag 65 can be prevented from being displaced by the left and right displacement prevention tethers 75L and 75R, and therefore an outflow direction of the inflation gas G flowing out from the upper side supply ports 68L and 68R can be stabilized. Further, in such a configuration, since the inner bag 65 is disposed in the outer bag 31 without being displaced by the displacement prevention tethers 75L and 75R on both the left and right sides and the gas guide tether 73 on the rear side, an arrangement position of the inner hag 65 in the outer bag 31 can be stabilized in folding or the like.

Further, in the airbag device 10 according to the embodiment, the airbag 29 is configured such that the boss portion B positioned in the vicinity of the center of the steering portion (ring portion) R gripped at the time of steering in the steering wheel W is disposed as the accommodating portion, and the vehicle body side wall portion 32 of the outer bag 31 at the time of inflation completion is supported by the ring surface RP on the upper surface side inclined rearward and downward in the ring portion R as the support surface, and is used for the drivers seat.

Therefore, in the embodiment, even when the driver as the occupant D1 approaches the rear end Rbe side of the steering portion R at the time of operation, the rear end portion 31ba of the outer hag 31 can be caused to enter a narrow gap between an abdomen portion DS of the driver D1 and the rear end Rbe of the steering portion R to inflate, and therefore the approaching driver D1 can be smoothly protected.

Further, in the airbag device 10 according to the embodiment, the airbag 29 has the inflation completion shape in which the thickness dimension Tf on the front portion 29a side is larger than the thickness dimension Tb on the rear portion 29b side (see FIG. 14B).

Therefore, in the embodiment, when the airbag 29 (outer bag 31) at the time of inflation completion is supported on the ring surface RP side of the ring portion R inclined rearward and downward, the occupant side wall portion 39 of the airbag 29 can be disposed along the vertical direction, and a substantially entire surface from the head DH to the abdomen portion DS of the driver D0 moving forward can be uniformly received on the receiving surface 41 which is a substantially vertical surface along the vertical direction, and the driver D0 can be received and protected without being applied with a partial reaction force to the driver D0. Therefore, a restraint performance of the driver D0 moving forward can be improved.

In the case of the embodiment, a difference between the thickness dimensions Tf and Tb is set by providing the front side base cloth 55 or disposing the tethers 44, whereas the different between the thickness dimensions Tf and Tb on the front portion 29a side and the rear portion 29b side may be set only by changing the shape or the length of the film of the outer peripheral wall 30, or by using only the tethers.

Further, the embodiment describes the airbag device 10 for the driver's seat mounted on the steering wheel W having a short length dimension in the longitudinal direction, whereas the airbag device according to the present invention may be mounted on a steering wheel in which the ring portion R has a substantially annular shape.

Furthermore, the embodiment describes the airbag device 10 for the driver's seat, and the present invention may be applied to an airbag device for a front passenger seat mounted on an instrument panel in front of the front passenger seat.

Further, in the embodiment, the direction YD in the radial direction from the inflow opening 34 in which the lower side supply port 71 of the inner bag 65 in the outer bag 31 and the gas guide tether 73 are disposed is set to the rear side, whereas in the airbag device of the present invention, when a portion of the outer peripheral edge of the vehicle body side wall portion in the direction toward the radial direction from the inflow opening in which the lower side supply port of the inner bag in the outer bag and the gas guide tether are disposed is quickly set as the portion to be inserted between the occupant and the vehicle body side member, and the airbag device is disposed, the outer bag is inflated in a state in which the portion of the outer peripheral edge of the vehicle body side wall portion is pressed against the vehicle body side member by the inflation gas at an initial stage of the inflation of the airbag. Therefore, when the lower side supply port of the inner bag and the gas guide tether are disposed on an area side where the outer bag is likely to approach the occupant during the operation, the end portion of the outer bag can smoothly enter and inflate between the approaching occupant and the vehicle body side member, whereby the occupant can be protected. Therefore, in the airbag device of the present invention, as the direction toward the radial direction from the inflow opening in which the lower side supply port of the inner bag and the gas guide tether are disposed, the lower side supply port and the gas guide tether may be disposed so as to correspond not only to the rear direction but also to various directions such as the left direction or the right direction on the area side which is easily brought close to the occupant during the operation.

What is claimed is:

1. An airbag device comprising:
    an airbag that is supported by a peripheral edge of an accommodating portion in a vehicle body side member and completes inflation so as to be able to receive an occupant by causing inflation gas to flow therein and protruding from the accommodating portion disposed in the vehicle body side member at a time of operation, wherein:
    an outer peripheral wall of the airbag at a time of inflation completion includes an occupant side wall portion capable of receiving the occupant, and a vehicle body side wall portion whose outer peripheral edge is connected to an outer peripheral edge of the occupant side wall portion and that is supported by the vehicle body side member at the peripheral edge of the accommodating portion;
    in the vicinity of a center of the vehicle body side wall portion, an inflow opening that is opened to allow the inflation gas to flow in, and an attachment portion that is disposed at a peripheral edge of the inflow opening and is fixed to an accommodating portion side are provided;
    the airbag includes an outer bag constituting the outer peripheral wall at the time of inflation completion, and an inner bag disposed so as to inflate inside the outer bag and having a plurality of supply ports through which the inflation gas is supplied to the outer bag, the outer bag and the inner bag sharing the inflow opening and the attachment portion;
    the inner bag completes the inflation prior to the outer bag, and the outer bag is inflated by the inflation gas supplied from the supply ports;
    an outer peripheral wall of the inner bag at the time of inflation completion includes:
        an upper side wall portion facing the occupant side wall portion of the outer bag; and
        a lower side wall portion whose outer peripheral edge is connected to an outer peripheral edge of the upper side wall portion, that faces the vehicle body side wall portion, and in which the inflow opening and the attachment portion are disposed;
    at least one of the plurality of supply ports is provided as a lower side supply port disposed in the lower side wall portion; and
    a gas guide tether that connects a vicinity of an outer edge side of the lower side supply port and the vehicle body side wall portion so as to be able to guide the inflation gas supplied from the lower side supply port to a vehicle body side wall portion side in an inner peripheral surface of the outer bag along a radial direction centered on the inflow opening is provided.

2. The airbag device according to claim 1, wherein a coupling portion with the vehicle body side wall portion is connected to a connection portion between the outer peripheral edges of the vehicle body side wall portion and the occupant side wall portion to dispose the gas guide tether.

3. The airbag device according to claim 1, wherein:
    the lower side supply port is disposed on a rear end portion side of the inner bag;
    the supply ports of the inner bag include the lower side supply port and upper side supply ports disposed on both left and right sides of the upper side wall portion on a front side of the lower side supply port; and
    the lower side supply port is disposed such that an opening area thereof at a time of opening is larger than a total opening area of the upper side supply ports at the time of opening.

4. The airbag device according to claim 3, wherein a displacement prevention tether that extends outward from a vicinity of an outer peripheral edge of the inner bag and is coupled to the outer bag is disposed on both left and right sides of a front portion side of the inner bag.

5. The airbag device according to claim 1, wherein:
    the accommodating portion is a boss portion positioned in the vicinity of a center of a steering portion in a steering wheel gripped at a time of steering;
    the steering portion is configured to support the vehicle body side wall portion of the outer bag at the time of inflation completion with an upper surface side inclined rearward and downward in the steering portion as a support surface; and
    the airbag is used for a driver's seat.

* * * * *